(12) United States Patent
Hung et al.

(10) Patent No.: US 11,506,537 B2
(45) Date of Patent: Nov. 22, 2022

(54) OPTICAL SENSING CIRCUIT, OPTICAL SENSING CIRCUIT ARRAY, AND METHOD FOR DETERMINING LIGHT COLOR BY USING THE SAME

(71) Applicant: AU OPTRONICS CORP., Hsin-Chu (TW)

(72) Inventors: Ching-Lang Hung, Hsin-Chu (TW); Chia-Wei Kuo, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 178 days.

(21) Appl. No.: 16/881,773

(22) Filed: May 22, 2020

(65) Prior Publication Data
US 2020/0393300 A1    Dec. 17, 2020

(30) Foreign Application Priority Data

Jun. 12, 2019    (TW) ................................. 108120284

(51) Int. Cl.
    *G01J 3/50* (2006.01)
    *G01J 1/46* (2006.01)
(52) U.S. Cl.
    CPC .. *G01J 3/50* (2013.01); *G01J 1/46* (2013.01)
(58) Field of Classification Search
    CPC ...... G01J 1/44; G01J 2001/444; G01J 1/4228; G01J 1/46; G01J 3/513; G01J 3/51;
    (Continued)

(56) References Cited

U.S. PATENT DOCUMENTS 9,848,482 B2    12/2017  Knapp
10,175,098 B2 *  1/2019  Lin ........................... G01J 1/46
(Continued)

FOREIGN PATENT DOCUMENTS

CN    102625944 A    8/2012
CN    103576354 A    2/2014
(Continued)

OTHER PUBLICATIONS

Office Action issued by China National Intellectual Property Administration dated Jun. 3, 2021.

*Primary Examiner* — John R Lee
(74) *Attorney, Agent, or Firm* — WPAT, PC

(57) ABSTRACT

An optical sensing circuit including a capacitor, a light sensing unit, a compensation unit, and a switching element is provided. The light sensing unit, the compensation unit, and the switching element are electrically connected to the capacitor. The light sensing unit senses the light of a first color. The compensation unit senses the light of a second color complementary to the first color. When a light illuminates the light sensing unit and the compensation unit, a first light component of the light corresponding to the first color causes the light sensing unit to generate a first current, and a second light component of the light corresponding to the second color causes the compensation unit to generate a second current, which reduces the amount of the charging or the discharging current when the first current charges or discharges the capacitor whose voltage is read as information for determining light color.

20 Claims, 25 Drawing Sheets

(58) Field of Classification Search
CPC .. G01J 3/506; G01J 3/505; G01J 3/501; G01J 3/50
See application file for complete search history.

(56) References Cited

U.S. PATENT DOCUMENTS

| | | | |
|---|---|---|---|
| 11,035,724 B2* | 6/2021 | Lin | G01J 3/513 |
| 11,131,582 B2* | 9/2021 | Tzeng | G01J 1/44 |
| 2012/0313913 A1 | 12/2012 | Shiraki et al. | |
| 2020/0158574 A1* | 5/2020 | Lin | G01J 3/505 |
| 2020/0393300 A1* | 12/2020 | Hung | G01J 3/50 |
| 2021/0033464 A1* | 2/2021 | Liao | G01J 1/46 |

FOREIGN PATENT DOCUMENTS

| | | |
|---|---|---|
| CN | 110095184 A | 8/2019 |
| CN | 111427470 A | 7/2020 |

\* cited by examiner

OPTICAL SENSING CIRCUIT, OPTICAL SENSING CIRCUIT ARRAY, AND METHOD FOR DETERMINING LIGHT COLOR BY USING THE SAME

This application claims the benefit of Taiwan application Serial No. 108120284, filed Jun. 12, 2019, the subject matter of which is incorporated herein by reference.

BACKGROUND OF THE INVENTION

Field of the Invention

The invention relates in general to an optical sensing circuit and an optical sensing circuit array, and a method for determining light color by using the same.

Description of the Related Art

Conventional optical sensing circuit has an a-Si thin film transistor (TFT) element (a light sensing element) and a capacitor coupled to the a-Si TFT. When the light source of a specific light color illuminates the optical sensing circuit, a light leakage current will be generated when the a-Si TFT element is turned off. The light leakage current causes the capacitor to discharge and generate a voltage change during an illumination process. Whether an optical signal is inputted can be detected according to the change in the signal to noise ratio (S/N ratio).

Generally speaking, a light sensing element can only sense the light of a color. For example, the red light sensing element can only sense a red input light, and the blue light sensing element and the green light sensing element can only sense a blue input light and a green input light respectively. When the ambient light is strong, for example, an ambient white light exists, the S/N ratio of the signal generated by the light sensing element will decrease as the intensity of the ambient white light increases, and error will occur to the determination of signal.

When the received light is a mixed input light, an error action may easily occur. Let the red light sensing element be taken for example. When the mixed light source having a red light component (such as a magenta light obtained by mixing a red light with a blue light) is inputted, the red light component of the magenta light will cause the red light sensing element to generate a light leakage current. Thus, the red light sensing element will erroneously determine that the red light exists and accordingly take an error action. For the CYM (cyan, yellow, and magenta) light, none of the conventional optical sensing circuit for red light, the conventional optical sensing circuit for blue light and the conventional optical sensing circuit for green light can correctly determine whether a CYM mixing light is inputted.

In the conventional method, to correctly determine whether a CYM mixing light is inputted, additional light sensing elements are required. And, the larger the variety of colors the input light has, the larger the amount of light sensing elements will be required. Thus, the algorithm used in the optical sensing circuit and the integrated chip (IC) will become more complicated. Therefore, how to resolve the problem of the algorithm of the optical sensing circuit and the integrated chip (IC) having an increased complexity when the input light has a number of colors has become a prominent task for the industries.

SUMMARY OF THE INVENTION

According to an embodiment of the present invention, an optical sensing circuit is provided. The optical sensing circuit includes a capacitor, a light sensing unit, a compensation unit, and a switching element. The light sensing unit is electrically connected to the capacitor and configured to sense a first color. The compensation unit is electrically connected to the capacitor and configured to sense a second color, wherein the second color is a complementary color of the first color. The switching element is electrically connected to the capacitor. When a light illuminates the light sensing unit and the compensation unit, a first light component of the light corresponding to the first color causes the light sensing unit to generate a first current, and a second light component of the light corresponding to the second color causes the compensation unit to generate a second current. The second current reduces the amount of a charging current or a discharging current when the first current charges or discharges the capacitor. When the switching element is turned on, the voltage of the capacitor is read as information for determining the color of the light.

According to another embodiment of the present invention, an optical sensing circuit array is provided. The optical sensing circuit array includes a number of optical sensing circuits, at least one signal line, and at least one scan line. The optical sensing circuits at least include a first optical sensing circuit, a second optical sensing circuit, and a third optical sensing circuit. Each optical sensing circuit includes a capacitor, a light sensing unit, a compensation unit, and a switching element. The light sensing unit is electrically connected to the capacitor and configured to sense a first color. The compensation unit is electrically connected to the capacitor and configured to sense a second color, wherein the second color is a complementary color of the first color. The switching element is electrically connected to the capacitor. The at least one signal line is configured to provide at least one operating signal to the light sensing unit of the first optical sensing circuit, the light sensing unit of the second optical sensing circuit, and the light sensing unit of the third optical sensing circuit. At least one scan line is configured to provide at least one scan signal to control the switching element of the first optical sensing circuit, the switching element of the second optical sensing circuit, and the switching element of the third optical sensing circuit. Under the situation that one of the at least one operating signal is enabled, when a light illuminates a corresponding light sensing unit and a corresponding compensation unit, a first light component of the light corresponding to the first color causes the corresponding light sensing unit to generate a first current, and a second light component of the light corresponding to the second color causes the corresponding compensation unit to generate a second current. The second current reduces the amount of the charging current or the discharging current when the first current charges or discharges a corresponding capacitor. When one of the at least one scan signal is enabled and causes a corresponding switching element to be turned on, the voltage of the corresponding capacitor is read as information for determining the color of the light.

According to an alternate embodiment of the present invention, a method for determining light color using the optical sensing circuit array mentioned above is provided. The method includes the following steps. Firstly, at least one of the at least one operating signal is enabled. When a light illuminates the light sensing unit and the compensation unit corresponding to at least one of the at least one enabled operating signal, a first light component of the light corresponding to the first color causes the corresponding light sensing unit to generate a first current, and a second light component of the light corresponding to the second color causes the corresponding compensation unit to generate a second current. The second current reduces the amount of the charging current or the discharging current when the first current charges or discharges the corresponding capacitor. Then, at least one of the at least one scan signal is enabled and causes the switching element corresponding to at least one of at least one enabled scan signal to be turned on and read the voltage of the corresponding capacitor. Afterwards, whether the color of the light is at least one of more than three colors is determined according to the voltage of the capacitor of the first optical sensing circuit, the voltage of the capacitor of the second optical sensing circuit, and the voltage of the capacitor of the third optical sensing circuit.

The above and other aspects of the invention will become better understood with regards to the following detailed description of the preferred but non-limiting embodiment(s). The following description is made with reference to the accompanying drawings.

DETAILED DESCRIPTION OF THE INVENTION

Figure 1:
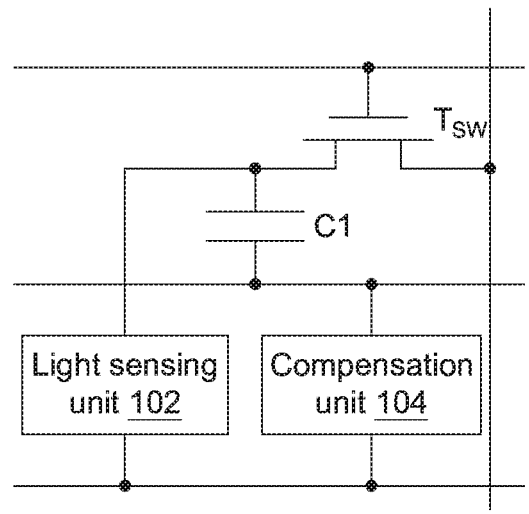
FIG. 1 is a schematic diagram of an optical sensing circuit according to an embodiment of the present disclosure.

Referring to FIG. 1, a schematic diagram of an optical sensing circuit 100 according to an embodiment of the present disclosure is shown. The optical sensing circuit 100 includes a capacitor C1, a light sensing unit 102, a compensation unit 104, and a switching element Tsw. The light sensing unit 102 is electrically connected to the capacitor C1 and configured to sense a first color. The compensation unit 104 is electrically connected to the capacitor C1 and configured to sense a second color. The second color mentioned above is a complementary color of the first color. The switching element Tsw is electrically connected to the capacitor C1.

When a light illuminates the light sensing unit 102 and the compensation unit 104, a first light component of the light corresponding to the first color causes the light sensing unit 102 to generate a first current, and a second light component of the light corresponding to the second color causes the compensation unit 104 to generate a second current. The second current reduces the amount of the charging current or the discharging current when the first current charges or discharges the capacitor C1. When the switching element Tsw is turned on, the voltage of the capacitor C1 is read as information for determining the color of the light.

Figure 2:
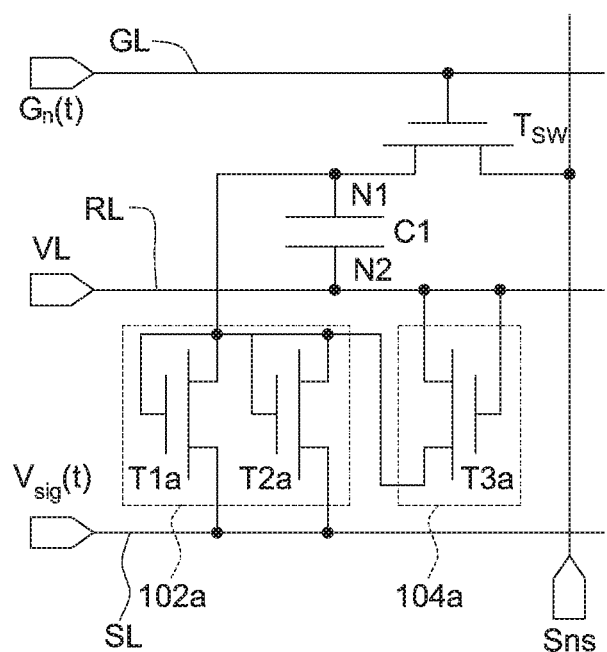
FIG. 2 is a circuit diagram of a first implementation of the optical sensing circuit.

The optical sensing circuit 100 of FIG. 1 can be implemented by different implementations. Referring to FIG. 2, a circuit diagram of a first implementation of the optical sensing circuit 100 is shown. The optical sensing circuit 100a includes a light sensing unit 102a and a compensation unit 104a. The light sensing unit 102a includes a first light sensing element T1a and a second light sensing element T2a, and the compensation unit 104a includes a third light sensing element T3a. The first light sensing element T1a, the second light sensing element T2a, and the third light sensing element T3a can be implemented by a red light sensing element, a green light sensing element, and a blue light sensing element respectively. Thus, since the light sensing unit 102a includes the first light sensing element T1a capable of sensing a red light and the second light sensing element T2at capable of sensing a green light, the light sensing unit 102a can sense a yellow light formed by mixing a red light with a green light. Under the situation that the first light sensing element T1a, the second light sensing element T2a, and the third light sensing element T3a are implemented by a red light sensing element, a green light sensing element and a blue light sensing element respectively, the first color mentioned above is yellow. When a light illuminates the optical sensing circuit 100a, a yellow light component of the light corresponding to yellow causes the light sensing unit 102a to generate a first current, such as a light leakage current. When a light illuminates the optical sensing circuit 100a, a red light component or a green light component of the light corresponding to yellow also causes the light sensing unit 102a to generate a first current. Under the situation that the compensation unit 104a includes the third light sensing element T3a capable of sensing a blue light, the second color mentioned above is blue. When a light illuminates the optical sensing circuit 100a, a blue light component of the light corresponding to blue causes the compensation unit 104a to generate a second current, such as a light leakage current.

Or, the first light sensing element T1a and the second light sensing element T2a of the light sensing unit 102a and the third light sensing element T3a of the compensation unit 104a also can be implemented by a green light sensing element, a blue light sensing element, and a red light sensing element respectively. Thus, since the light sensing unit 102a includes the first light sensing element T1a capable of sensing a green light and the second light sensing element T2a capable of sensing a blue light, the light sensing unit 102a can sense a cyan light formed by mixing a green light with a blue light; meanwhile, the first color mentioned above is cyan. When a light illuminates the optical sensing circuit 100a, a cyan light component of the light corresponding to cyan causes the light sensing unit 102a to generate a first current, and a green light component and a blue light component of the light corresponding to cyan also cause the light sensing unit 102a to generate a first current. Since the compensation unit 104a includes the third light sensing element T3a capable of sensing a red light, the second color mentioned above is red. When a light illuminates the optical sensing circuit 100a, a red light component of the light corresponding to red causes the compensation unit 104a to generate a second current.

Moreover, the first light sensing element T1a and the second light sensing element T2a of the light sensing unit 102a and the third light sensing element T3a of the compensation unit 104a also can be implemented by a blue light sensing element, a red light sensing element, and a green light sensing element respectively. Thus, since the light sensing unit 102a includes the first light sensing element T1a capable of sensing a blue light and the second light sensing element T2a capable of sensing a red light, the light sensing unit 102a can sense a magenta light formed by mixing a blue light with a red light; meanwhile, the first color mentioned above is magenta. When a light illuminates the optical sensing circuit 100a, a magenta light component of the light corresponding to magenta causes the light sensing unit 102a to generate a first current, and a blue light component and a red light component of the light corresponding to magenta also cause the light sensing unit 102a to generate a first current. Since the compensation unit 104a includes the third light sensing element T3a capable of sensing a green light, the second color mentioned above is green. When a light illuminates the optical sensing circuit 100a, a green light component of the light corresponding to green causes the compensation unit 104a to generate a second current.

The first light component of the light corresponding to the first color can refer to the light component of the color component of the first color. For example, when the first color is yellow (formed of red and green), the first light component of the light corresponding to yellow also includes the red light component and the green light component, and either one of the red light component and the green light component can cause the corresponding light sensing unit 102a to generate a first current. For example, when the first color is cyan (formed of blue and green), the first light component of the light corresponding to cyan also includes the blue light component and the green light component, and either one of the blue light component and the green light component can cause the corresponding light sensing unit 102a to generate a first current. For example, when the first color is magenta (formed of blue and red), the first light component of the light corresponding to magenta also includes the blue light component and the red light component, and either one of the blue light component and the red light component can cause the corresponding light sensing unit 102a to generate a first current.

Furthermore, the capacitor C1 has a first end N1 and a second end N2. The first light sensing element T1a, the second light sensing element T2a, and the third light sensing element T3a can be implemented by, for example, diode-connected thin-film transistors (TFTs). That is, the gate of the TFT and one end (such as the drain) of the TFT are electrically connected. The gate of the first light sensing element T1a (and one end (such as the drain) of the TFT) and the gate of the second light sensing element T2a (and one end (such as the drain) of the TFT) are electrically connected to the first end N1 of the capacitor C1. The third light sensing element T3a is electrically connected to the second end N2 of the capacitor C1. The switching element Tsw is electrically connected to the first end N1 of the capacitor C1.

Another end (such as the source) of the first light sensing element T1a and another end (such as the source) of the second light sensing element T2a are electrically connected to a signal line SL configured to provide an operating signal Vsig(t) to the first light sensing element T1a and the second light sensing element T2a. The switching element Tsw is electrically connected to a scan line GL configured to provide a scan signal Gn(t) to control the switching element Tsw. The gate and one end (such as the drain) of the third light sensing element T3a are electrically connected to a reference voltage line RL to receive a reference voltage VL. The reference voltage VL is, for example, a low voltage Vlow.

Figure 3A:
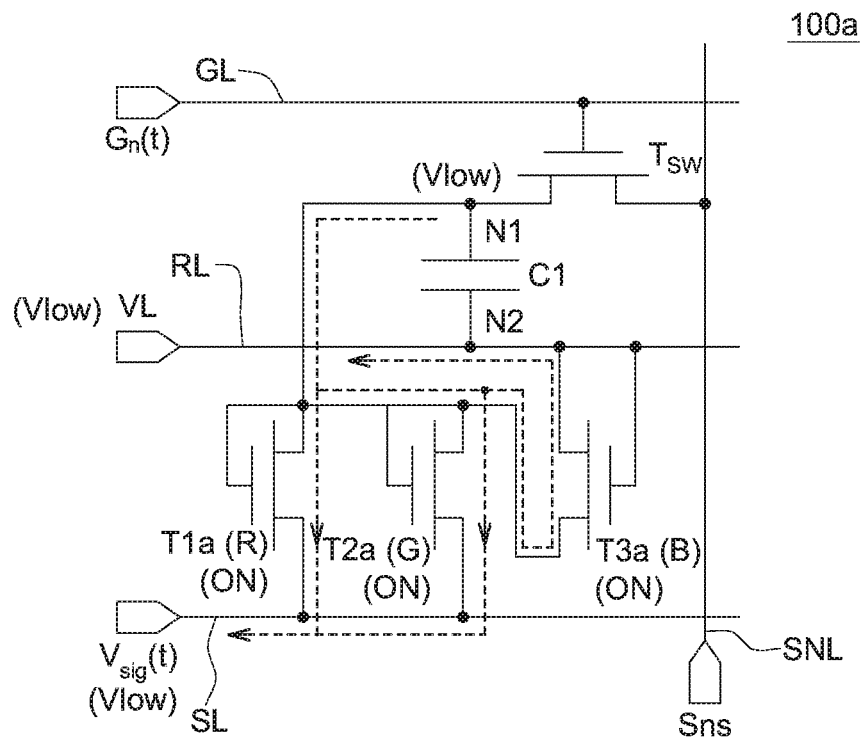
FIG. 3A is an operation diagram of the optical sensing circuit when the optical sensing circuit is reset.
Figure 3B:
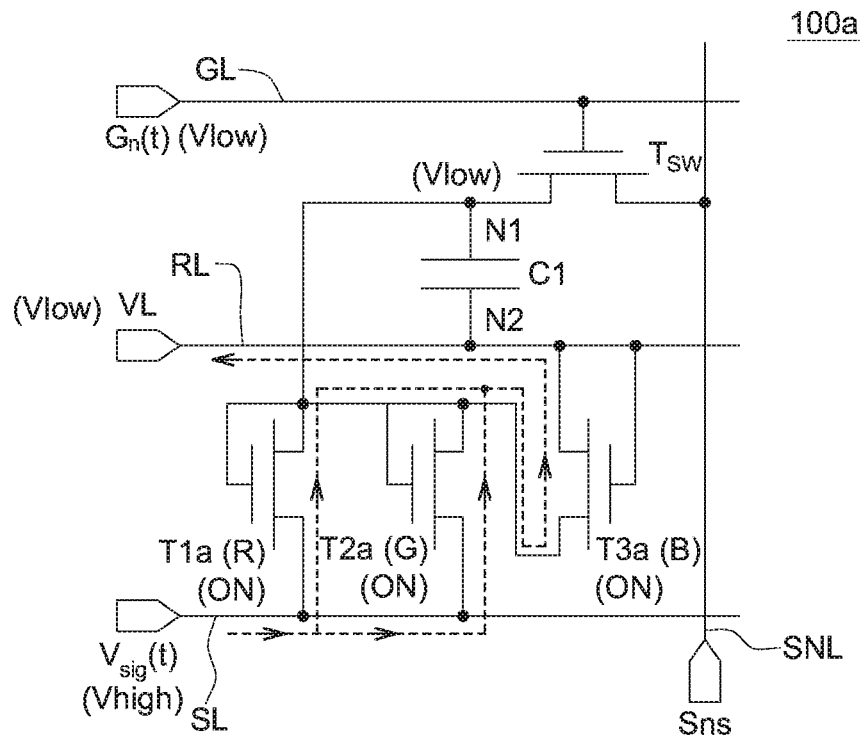
FIG. 3B is an operation diagram of the optical sensing circuit when the optical sensing circuit is illuminated by an ambient white light.
Figure 3C:
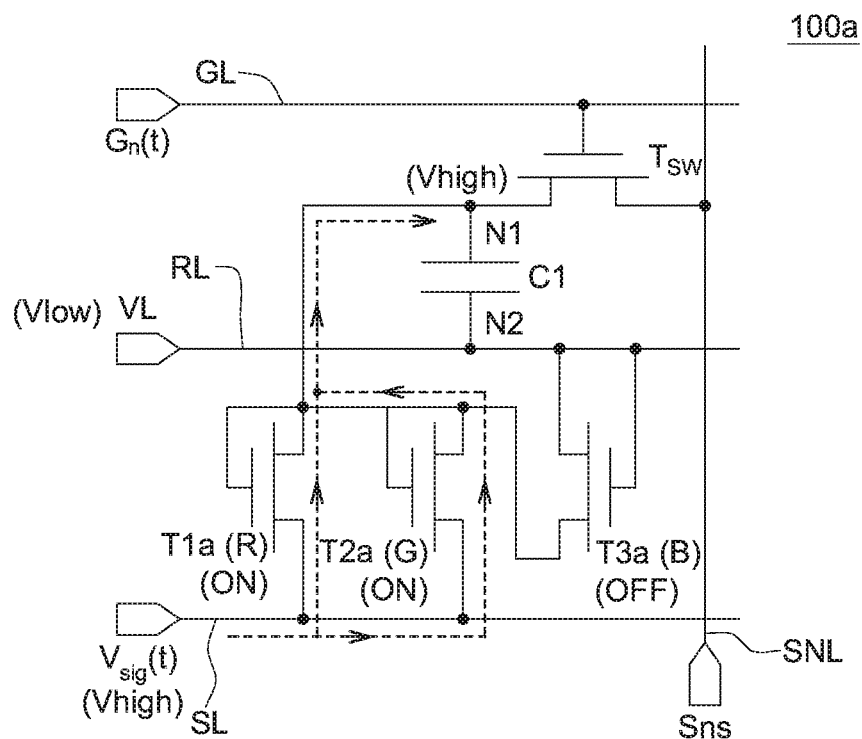
FIG. 3C is an operation diagram of the optical sensing circuit when the optical sensing circuit is illuminated by a yellow light.
Figure 3D:
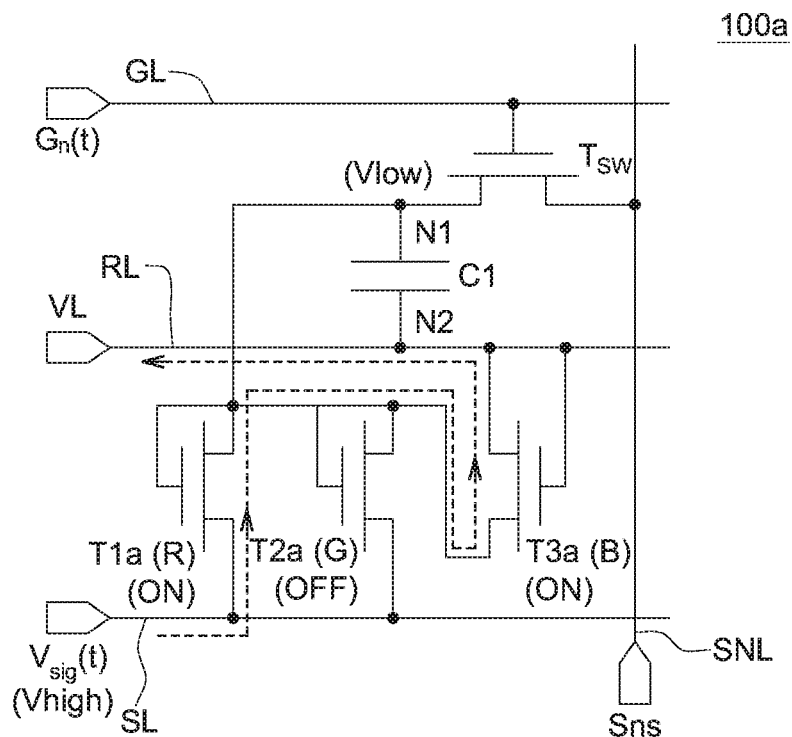
FIG. 3D is an operation diagram of the optical sensing circuit when the optical sensing circuit is illuminated by a magenta light.

The operations of the optical sensing circuit 100a are exemplified below. Referring to FIGS. 3A-3D, examples of the operations of the optical sensing circuit 100a are shown. Let the first light sensing element T1a and the second light sensing element T2a of the light sensing unit 102a and the third light sensing element T3a of the compensation unit 104a be a red light sensing element, a green light sensing element, and a blue light sensing element respectively. FIG. 3A is an operation diagram of the optical sensing circuit 100a when the optical sensing circuit 100a is reset. FIG. 3B is an operation diagram of the optical sensing circuit 100a when the optical sensing circuit 100a is illuminated by an ambient white light. FIG. 3C is an operation diagram of the optical sensing circuit 100a when the optical sensing circuit is illuminated by a yellow light. FIG. 3D is an operation diagram of the optical sensing circuit 100a when the optical sensing circuit 100a is illuminated by a magenta light. Also, referring to FIG. 4, an example of waveforms of relevant signals of the optical sensing circuit 100a is shown.

Figure 4:
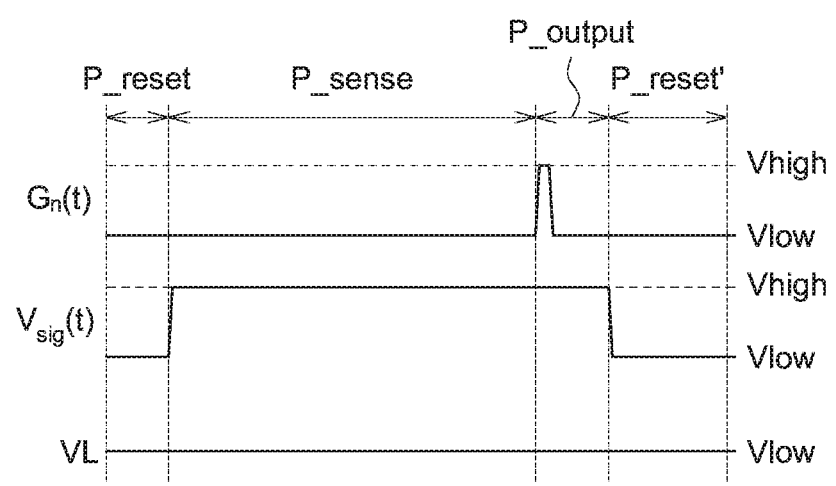
FIG. 4 is an example of waveforms of relevant signals of the optical sensing circuit.

Refer to FIG. 3A and FIG. 4 simultaneously. During the reset period P_reset, the operating signal Vsig(t) is disabled, and the scan signal Gn(t) is also disabled. For example, the operating signal Vsig(t) and the scan signal Gn(t) both have a low voltage Vlow. At this time, the charges of the capacitor C1 are discharged through the first light sensing element T1a, the second light sensing element T2a and the third light sensing element T3a, and the voltage of the first node N1 of the capacitor C1 changes to be the low voltage Vlow. The discharging path is indicated by the dotted arrows of FIG. 3A.

Refer to FIG. 3B and FIG. 4 simultaneously. During the sensing period P_sense, the operating signal Vsig(t) is enabled, and the scan signal Gn(t) is disabled. For example, the operating signal Vsig(t) has a high voltage Vhigh, and the scan signal Gn(t) has a low voltage Vlow. At this time, under the situation that the operating signal Vsig(t) is enabled, suppose the ambient white light illuminates the light sensing unit 102a and the compensation unit 104a, a red light component of the ambient white light causes the first light sensing element T1a of the light sensing unit 102a to generate a current, a green light component of the ambient white light causes the second light sensing element T2a of the light sensing unit 102a to generate a current, and a blue light component of the ambient white light also causes the third light sensing element T3a of the compensation unit 104a to generate a current. Since the current generated by the first light sensing element T1a and the second light sensing element T2a will flow towards the reference voltage line RL through the third light sensing element T3a without charging the capacitor C1, the first node N1 of the capacitor C1 will remain at the low voltage Vlow. That is, the current generated by the third light sensing element T3a will reduce the amount of the charging current when the current generated by the first light sensing element T1a and the second light sensing element T2a charges the capacitor C1. Moreover, the amount of the charging current of the capacitor C1 can be even nearly 0 so as not to affect the voltage of the capacitor C1.

Refer to simultaneously FIG. 3C and FIG. 4. Similarly, during a sensing period P_sense, the operating signal Vsig(t) is enabled, and the scan signal Gn(t) is disabled. At this time, under the situation that the operating signal Vsig(t) is enabled, suppose the yellow light illuminates the light sensing unit 102a and the compensation unit 104a. Since the yellow light has a red light component and a green light component, the red light component of the yellow light causes the first light sensing element T1a of the light sensing unit 102a to generate a current, and the green light component of the yellow light causes the second light sensing element T2a of the light sensing unit 102a to generate a current. Furthermore, since the yellow light does not have a blue light component, the third light sensing element T3a of the compensation unit 104a will not generate any current. The current generated by the first light sensing element T1a and the second light sensing element T2a will charge the capacitor C1 and cause the first node N1 of the capacitor C1 to change to a high voltage Vhigh. That is, no current will be generated by the third light sensing element T3a to compensate (for example, to reduce) the amount of the current generated by the first light sensing element T1a and the second light sensing element T2a to charge the capacitor C1 and allow the first node N1 of the capacitor C1 to change to a high voltage Vhigh.

Refer to FIG. 3D and FIG. 4 simultaneously. Similarly, during a sensing period P_sense, the operating signal Vsig(t) is enabled, and the scan signal Gn(t) is disabled. At this time, under the situation that the operating signal Vsig(t) is enabled, suppose the magenta light illuminates the light sensing unit 102a and the compensation unit 104a. Since the magenta light has a red light component and a blue light component, the red light component of the magenta light causes the first light sensing element T1a of the light sensing unit 102a to generate a current. Since the magenta light does not have a green light component, the second light sensing element T2a of the light sensing unit 102a will not generate any current. The blue light component of the magenta light causes the third light sensing element T3a of the compensation unit 104a to generate a current. Since the current generated by the first light sensing element T1a will flow towards the reference voltage line RL through the third light sensing element T3a without charging the capacitor C1, the first node N1 of the capacitor C1 will remain at the low voltage Vlow. That is, the current generated by the third light sensing element T3a will compensate (for example, reduce) the amount of the current generated by the first light sensing element T1a to charge the capacitor C1 and allow the first node N1 of the capacitor C1 to remain at the low voltage Vlow.

Refer to FIG. 3A-3D and FIG. 4 simultaneously. During an output period P_output, the scan signal Gn(t) is enabled and causes the switching element Tsw to be turned on. At this time, the voltage of the capacitor C1 (such as the voltage of the first node N1) is read as information for determining the color of the light. For example, during the output period P_output, the voltage N1 of the capacitor C1 of FIG. 3A is read by a controller (not shown) through the switching element Tsw and the sensing line SNL. Since the voltage N1 of the capacitor C1 read by the controller has a low voltage Vlow and the sensing signal Sns also has a low voltage, the controller will determine that the state of the optical sensing circuit 100a is OFF.

Similarly, during an output period P_output, the voltage N1 of the capacitor C1 of FIGS. 3B-3D is read by a controller (not shown) through the switching element Tsw and the sensing line SNL. Since the voltage N1 of the capacitor C1 has a low voltage Vlow, a high voltage Vhigh, and a low voltage Vlow in FIGS. 3B-3D respectively, the controller will determine that the state of the optical sensing circuit 100a in FIGS. 3B-3D is OFF, ON, and OFF respectively.

Let the optical sensing circuit 100a in which the first light sensing element T1a and the second light sensing element T2a of the light sensing unit 102a are a red light sensing element and a green light sensing element be defined as an R+G sensor. Let the optical sensing circuit 100a in which the first light sensing element T1a and the second light sensing element T2a of the light sensing unit 102a is a green light sensing element and a blue light sensing element be defined as a G+B sensor. Let the optical sensing circuit 100a in which the first light sensing element T1a and the second light sensing element T2a of the light sensing unit 102a are a blue light sensing element and a red light sensing element be defined as a B+R sensor. Thus, when an ambient white light, a red light, a green light, a blue light, a magenta light, a yellow light, and a cyan light respectively illuminate the R+G sensor, the G+B sensor, and the B+R sensor, respective ON/OFF states of the optical sensing circuit 100a is listed in Table 1.

TABLE 1

| Light source | R + G sensor | G + B sensor | B + R sensor | Determination results |
|---|---|---|---|---|
| Ambient white light | OFF | OFF | OFF | No signal |
| Red light | ON | OFF | ON | Red light |
| Green light | ON | ON | OFF | Green light |
| Blue light | OFF | ON | ON | Blue light |
| Magenta light | OFF | OFF | ON | Magenta light |
| Yellow light | ON | OFF | OFF | Yellow light |
| Cyan light | OFF | ON | OFF | Cyan light |

As listed in Table 1, the R+G sensor, the G+B sensor, and the B+R sensor can be used together and illuminated by a light simultaneously, the controller can determine the color of the light according to the determination results of respective ON/OFF states of the R+G sensor, the G+B sensor, and the B+R sensor. For example, when the optical sensing circuit 100a is illuminated by an ambient white light, the R+G sensor, the G+B sensor, and the B+R sensor are all turned off (OFF), and no determination results will be generated. When the R+G sensor, the G+B sensor, and the B+R sensor respectively are turned on (ON), turned off (OFF), and turned on (ON), it can be determined that the light currently illuminating the sensors is a red light. When the R+G sensor, the G+B sensor, and the B+R sensor respectively are turned off (OFF), turned off (OFF), and turned on (ON), it can be determined that the light currently illuminating the sensors is a magenta light.

Thus, under the situation that the R+G sensor, the G+B sensor, and the B+R sensor are disposed, the color of the light currently illuminating the R+G sensor, the G+B sensor, and the B+R sensor can be determined according to respective ON/OFF states of the R+G sensor, the G+B sensor, and the B+R sensor with reference to the relationship between the color of the illuminating light and the ON/Off state of the R+G sensor, the G+B sensor, and the B+R sensor as listed in Table 1. Unlike the conventional method which requires 6 sensors in the determination of 6 colors, the embodiment of the present disclosure only requires 3 sensors in the determination of 6 colors and therefore achieves the effects of saving elements, decreasing circuit complexity and reducing cost. Moreover, since the ambient white light is equivalent to the situation of no signal (no input of optical signals) in terms of determination results, the ambient white light will less affect the determination regarding the color of the illuminating light, and the S/N ratio will be effectively increased.

Figure 5A:
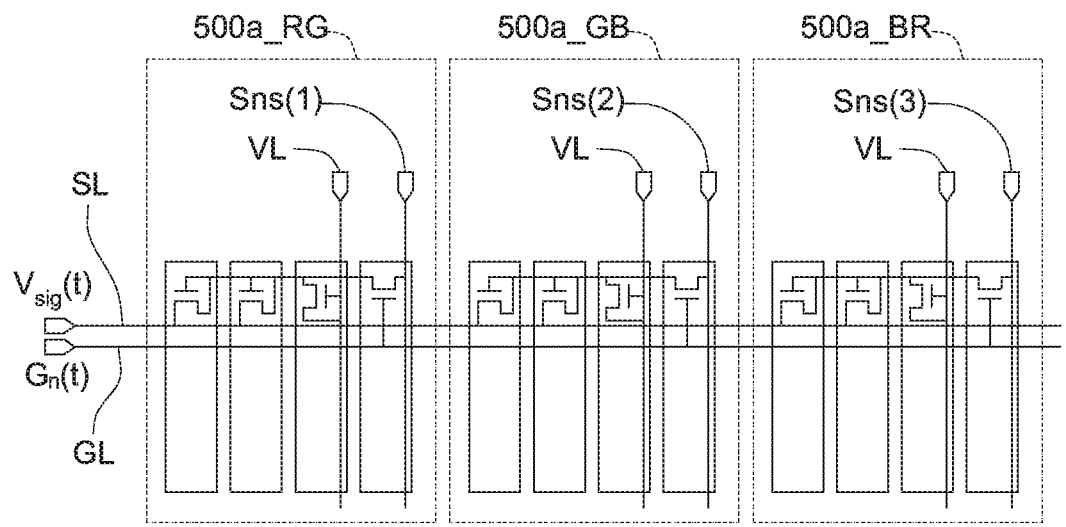
FIG. 5A illustrates an optical sensing circuit array using the optical sensing circuit of FIG. 2.

Referring to FIG. 5A, an optical sensing circuit array 500 using the optical sensing circuit 100a of FIG. 2 is illustrated. The optical sensing circuit array 500 includes a number of optical sensing circuits, at least one signal line SL, and at least one scan line GL. In FIG. 5A, the optical sensing circuit array 500 including a signal line SL and a scan line GL is taken for example. The optical sensing circuits at least include a first optical sensing circuit 500a_RG, a second optical sensing circuit 500a_GB, and a third optical sensing circuit 500a_BR. The architecture of each optical sensing circuit is as shown in FIG. 2. To simplify the drawing, FIG. 5A illustrates only a part of the elements of the optical sensing circuit. In FIGS. 6A, 7A, 8A, and 9A, only a part of the elements of the optical sensing circuit are illustrated, and the architecture of each optical sensing circuit is shown in FIG. 2. Refer to FIG. 5A and FIG. 2 simultaneously. The at least one signal line SL is configured to provide at least one operating signal Vsig(t) to the light sensing unit 102a of the first optical sensing circuit 500a_RG, the light sensing unit 102a of the second optical sensing circuit 500a_GB, and the light sensing unit 102a of the third optical sensing circuit 500a_BR. The at least one scan line GL is configured to provide at least one scan signal Gn(t) to control the switching elements Tsw of the light sensing unit 102a of the first optical sensing circuit 500a_RG, the light sensing unit 102a of the second optical sensing circuit 500a_GB, and the light sensing unit 102a of the third optical sensing circuit 500a_BR.

Figure 5B:
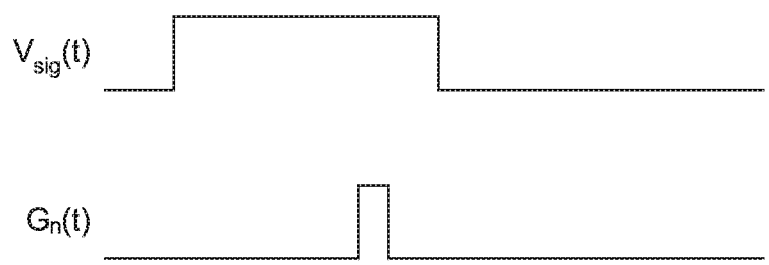
FIG. 5B is a waveform diagram of relevant signals used in the optical sensing circuit array of FIG. 5A.

Referring to FIG. 5B, a waveform diagram of relevant signals used in the optical sensing circuit array 500 of FIG. 5A is shown. The first optical sensing circuit 500a_RG, the second optical sensing circuit 500a_GB, and the third optical sensing circuit 500a_BR can be implemented by an R+G sensor, a G+B sensor, and a B+R sensor, respectively, for example. Under the situation that the operating signal Vsig(t) is enabled, when a light illuminates the light sensing unit 102a and the compensation unit 104a of the first optical sensing circuit 500a_RG, the light sensing unit 102a and the compensation unit 104a of the second optical sensing circuit 500a_GB, and the light sensing unit 102a and the compensation unit 104a of the third optical sensing circuit 500a_BR, the light components of the light corresponding to red and green cause the light sensing unit 102a of the first optical sensing circuit 500a_RG to generate a first current, and the light component of the light corresponding to blue causes the compensation unit 104a of the first optical sensing circuit 500a_RG to generate a second current. The second current reduces the amount of the charging current or the discharging current when the first current charges or discharges the corresponding capacitor C1. The first optical sensing circuit 500a_RG, the second optical sensing circuit 500a_GB, and the third optical sensing circuit 500a_BR are horizontally arranged and share the same signal line and the same scan line. When the scan signal Gn(t) is enabled and causes the switching element Tsw of the first optical sensing circuit 500a_RG to be turned on, the voltage of the capacitor C1 of the first optical sensing circuit 500a_RG is read as information for determining the color of the light. Thus, whether the first optical sensing circuit 500a_RG is turned on (ON) or turned off (OFF) can be determined. For example, when the voltage of the first node N1 of the capacitor C1 is greater than a threshold, it is determined that the first optical sensing circuit 500a_RG is turned on (ON). The operations of the second optical sensing circuit 500a_GB and the third optical sensing circuit 500a_BR can be obtained by the same analogy, and the similarities are not repeated here.

Under the illumination of the lights of different colors, the first optical sensing circuit 500a_RG, the second optical sensing circuit 500a_GB, and the third optical sensing circuit 500a_BR will have different ON/OFF states. As listed in Table 1, the color of the light can be determined according to a combination of respective ON/OFF states of the first optical sensing circuit 500a_RG, the second optical sensing circuit 500a_GB, and the third optical sensing circuit 500*a*_BR. For example, if the first optical sensing circuit 500*a*_RG, the second optical sensing circuit 500*a*_GB, and the third optical sensing circuit 500*a*_BR respectively are turned off (OFF), turned on (ON), and turned off (OFF), it can be determined that the color of the light is cyan.

The first optical sensing circuit 500*a*_RG, the second optical sensing circuit 500*a*_GB, and the third optical sensing circuit 500*a*_BR can be arranged in other orders in addition to that indicated in FIG. 5A. The first optical sensing circuit, the second optical sensing circuit, and the third optical sensing circuit of the optical sensing circuit array as arranged in following figures can also be arranged in different orders.

Figure 6A:
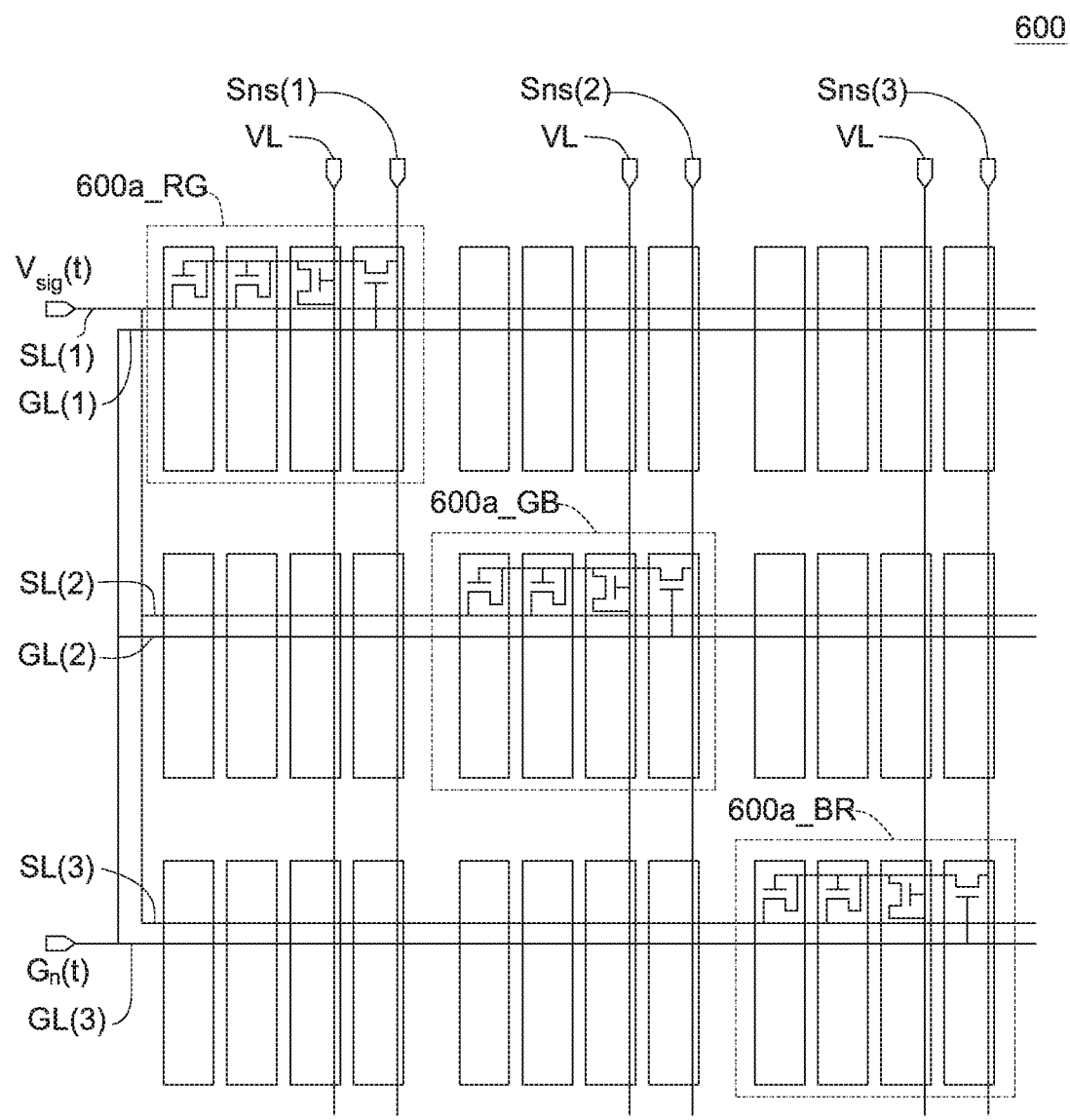
FIG. 6A illustrates another example of an optical sensing circuit array using the optical sensing circuit of FIG. 2.
Figure 6B:
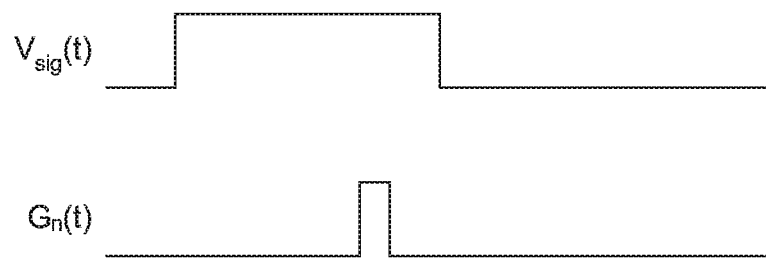
FIG. 6B is a waveform diagram of relevant signals used in the optical sensing circuit array of FIG. 6A.

Referring to FIG. 6A, another example of an optical sensing circuit array using the optical sensing circuit 100*a* of FIG. 2 is illustrated. Referring to FIG. 6B, a waveform diagram of relevant signals used in the optical sensing circuit array 600 of FIG. 6A is shown. The at least one signal line includes a first signal line SL(1), a second signal line SL(2), and a third signal line SL(3), wherein the first signal line SL(1), the second signal line SL(2), and the third signal line SL(3) are electrically connected to each other, and the same operating signal Vsig(t) is provided to the light sensing unit 102*a* of the first optical sensing circuit 600*a*_RG, the light sensing unit 102*a* of the second optical sensing circuit 600*a*_GB, and the light sensing unit 102*a* of the third optical sensing circuit 600*a*_BR. The at least one scan line includes a first scan line GL(1), a second scan line GL(2), and a third scan line GL(3), wherein the first scan line GL(1), the second scan line GL(2), and the third scan line GL(3) are electrically connected to each other, and the same scan signal Gn(t) is provided to the switching element Tsw of the first optical sensing circuit 600*a*_RG, the switching element Tsw of the second optical sensing circuit 600*a*_GB, and the switching element Tsw of the third optical sensing circuit 600*a*_BR. The first optical sensing circuit 600*a*_RG, the second optical sensing circuit 600*a*_GB, and the third optical sensing circuit 600*a*_BR are obliquely arranged.

In the optical sensing circuit array 600 of FIG. 6A, the first optical sensing circuit 600*a*_RG, the second optical sensing circuit 600*a*_GB, and the third optical sensing circuit 600*a*_BR respectively are located on different rows. The first optical sensing circuit 600*a*_RG is located to the left of the second optical sensing circuit 600*a*_GB, and the third optical sensing circuit 600*a*_BR is located to the right of the second optical sensing circuit 600*a*_GB, such that the first optical sensing circuit 600*a*_RG, the second optical sensing circuit 600*a*_GB, the third optical sensing circuit 600*a*_BR are obliquely arranged. To determine the color of the light, the optical sensing circuit array 600 of FIG. 6A needs to scan 3 optical sensing circuits located on different rows. In the example of FIG. 6A, the 3 optical sensing circuits of the optical sensing circuit array 600 located on different rows are scanned simultaneously. The optical sensing circuit array 600 of FIG. 6A advantageously reduces the amount of optical sensing circuits (that is, the amount of sensing points that need to be determined is reduced). Since the amount of optical sensing circuits is reduced and the interval between the optical sensing circuits is increased, the coupling problems caused by interleaved traces can be reduced.

Figure 7A:
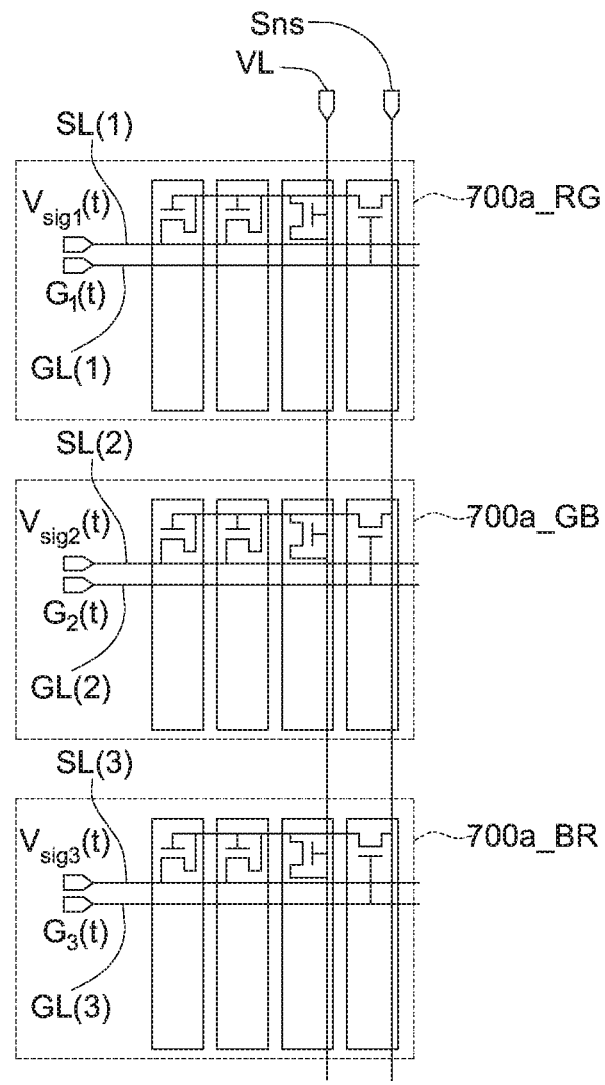
FIG. 7A illustrates an alternate example of an optical sensing circuit array using the optical sensing circuit of FIG. 2.
Figure 7B:
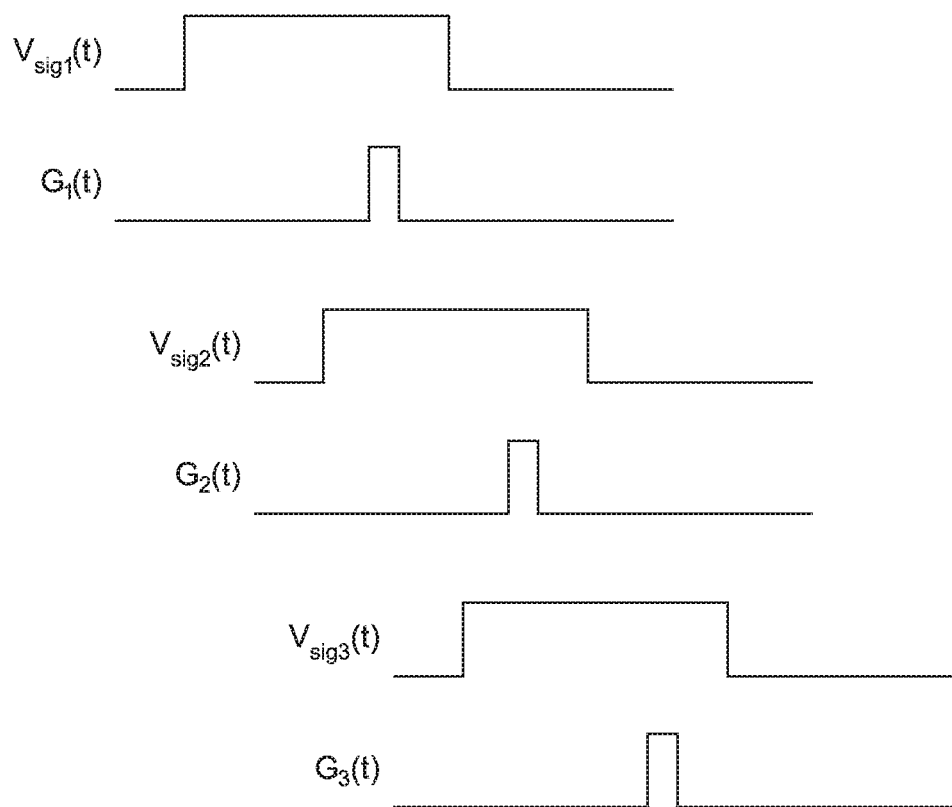
FIG. 7B is a waveform diagram of relevant signals used in the optical sensing circuit array of FIG. 7A.

Referring to FIG. 7A, an alternate example of an optical sensing circuit array using the optical sensing circuit 100*a* of FIG. 2 is illustrated. Referring to FIG. 7B, a waveform diagram of relevant signals used in the optical sensing circuit array 700 of FIG. 7A is shown. The at least one signal line includes a first signal line SL(1), a second signal line SL(2), and a third signal line SL(3). The operating signals Vsig1(t), Vsig2(t) and Vsig3(t) respectively are applied to the light sensing unit 102*a* of the first optical sensing circuit 700*a*_RG, the light sensing unit 102*a* of the second optical sensing circuit 700*a*_GB, and the light sensing unit 102*a* of the third optical sensing circuit 700*a*_BR through the first signal line SL(1), the second signal line SL(2), and the third signal line SL(3). The at least one scan line includes a first scan line GL(1), a second scan line GL(2), and a third scan line GL(3). The scan signals G1(t), G2(t), and G3(t) respectively are applied to the switching element Tsw of the first optical sensing circuit 700*a*_RG, the switching element Tsw of the second optical sensing circuit 700*a*_GB, and the switching element Tsw of the third optical sensing circuit 700*a*_BR through the first scan line GL(1), the second scan line GL(2), and the third scan line GL(3). The first optical sensing circuit 700*a*_RG, the second optical sensing circuit 700*a*_GB, and the third optical sensing circuit 700*a*_BR are vertically arranged.

As shown in FIG. 7B, the operating signals Vsig1(t), Vsig2(t) and Vsig3(t) are sequentially enabled and cause the first optical sensing circuit 700*a*_RG, the second optical sensing circuit 700*a*_GB, and the third optical sensing circuit 700*a*_BR to sequentially sense optical signals. During the period when the operating signals Vsig1(t), Vsig2(t) and Vsig3(t) are enabled, the scan signals G1(t), G2(t), and G3(t) are sequentially enabled and the voltage of the capacitor of the first optical sensing circuit 700*a*_RG, the voltage of the capacitor of the second optical sensing circuit 700*a*_GB, and the voltage of the capacitor of the third optical sensing circuit 700*a*_BR are sequentially read for determining respective ON/OFF states of the first optical sensing circuit 700*a*_RG, the second optical sensing circuit 700*a*_GB, and the third optical sensing circuit 700*a*_BR. The color of the light illuminating the first optical sensing circuit 700*a*_RG, the second optical sensing circuit 700*a*_GB, and the third optical sensing circuit 700*a*_BR can be determined according to respective ON/OFF states of the first optical sensing circuit 700*a*_RG, the second optical sensing circuit 700*a*_GB, and the third optical sensing circuit 700*a* BR as listed in Table 1.

Figure 8A:
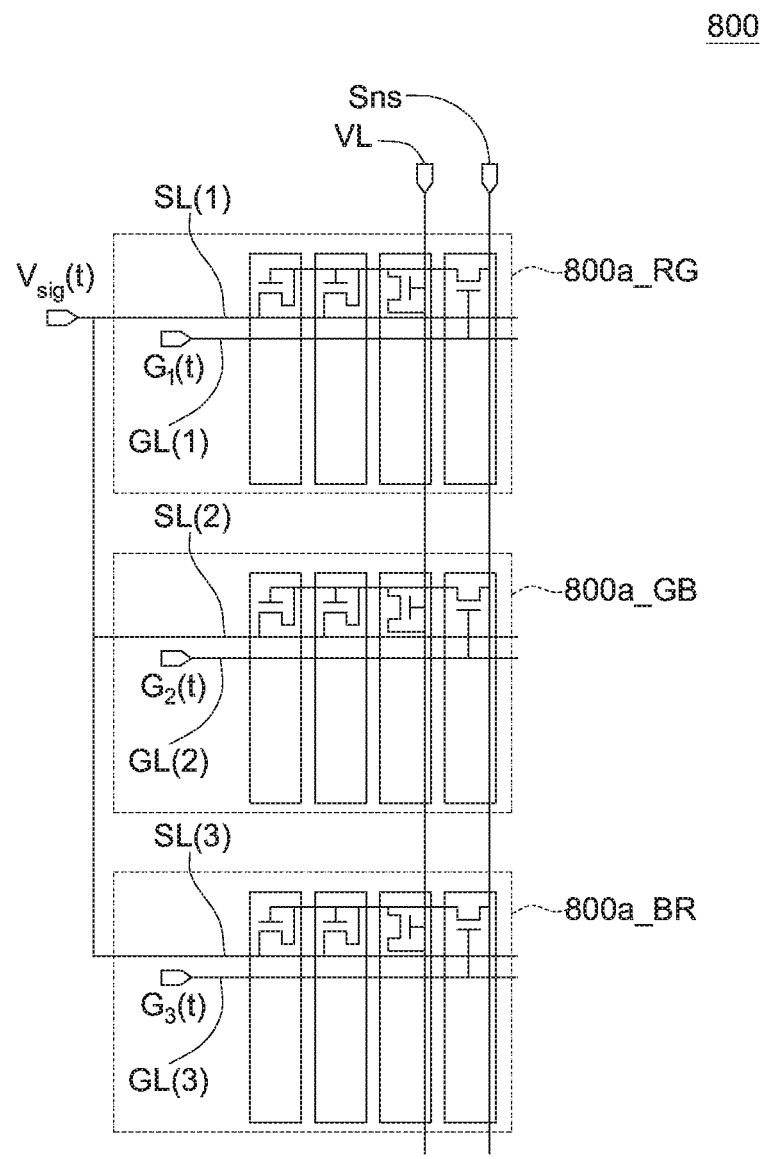
FIG. 8A illustrates another alternate example of an optical sensing circuit array using the optical sensing circuit of FIG. 2.
Figure 8B:
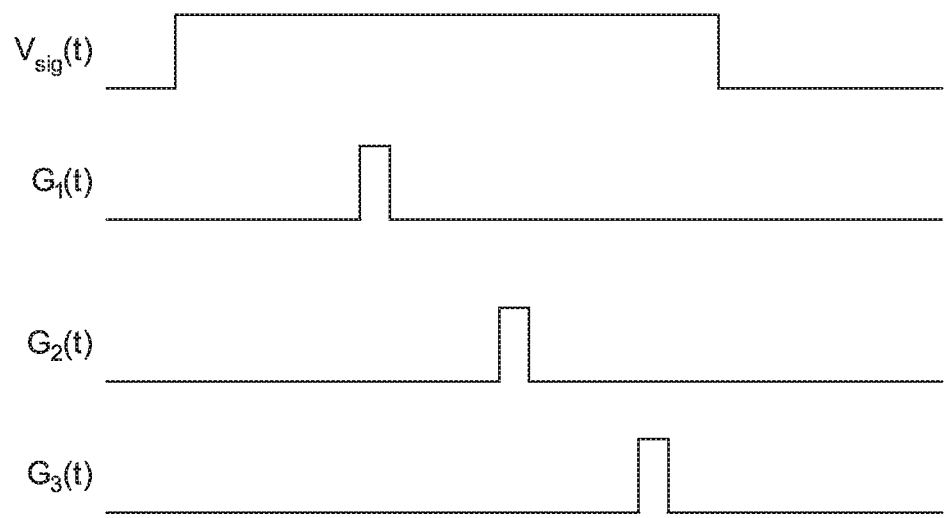
FIG. 8B is a waveform diagram of relevant signals used in the optical sensing circuit array of FIG. 8A.

Referring to FIG. 8A, another alternate example of an optical sensing circuit array using the optical sensing circuit 100*a* of FIG. 2 is illustrated. Referring to FIG. 8B, a waveform diagram of relevant signals used in the optical sensing circuit array 800 of FIG. 8A is shown. The optical sensing circuit array 800 of FIG. 8A is different from the optical sensing circuit array 700 of FIG. 7A in that the first signal line SL(1), the second signal line SL(2), and the third signal line SL(3) are electrically connected to each other and receive the same operating signal Vsig(t). As shown in FIG. 8B, after the operating signal Vsig(t) is enabled, the scan signals G1(t), G2(t), and G3(t), during a period when the operating signal Vsig(t) is enabled, are sequentially enabled, and the voltage of the capacitor of the first optical sensing circuit 800*a*_RG, the voltage of the capacitor of the second optical sensing circuit 800*a*_GB, and the voltage of the capacitor of the third optical sensing circuit 800*a*_BR are sequentially read for determining the color of the illuminating light.

Figure 9A:
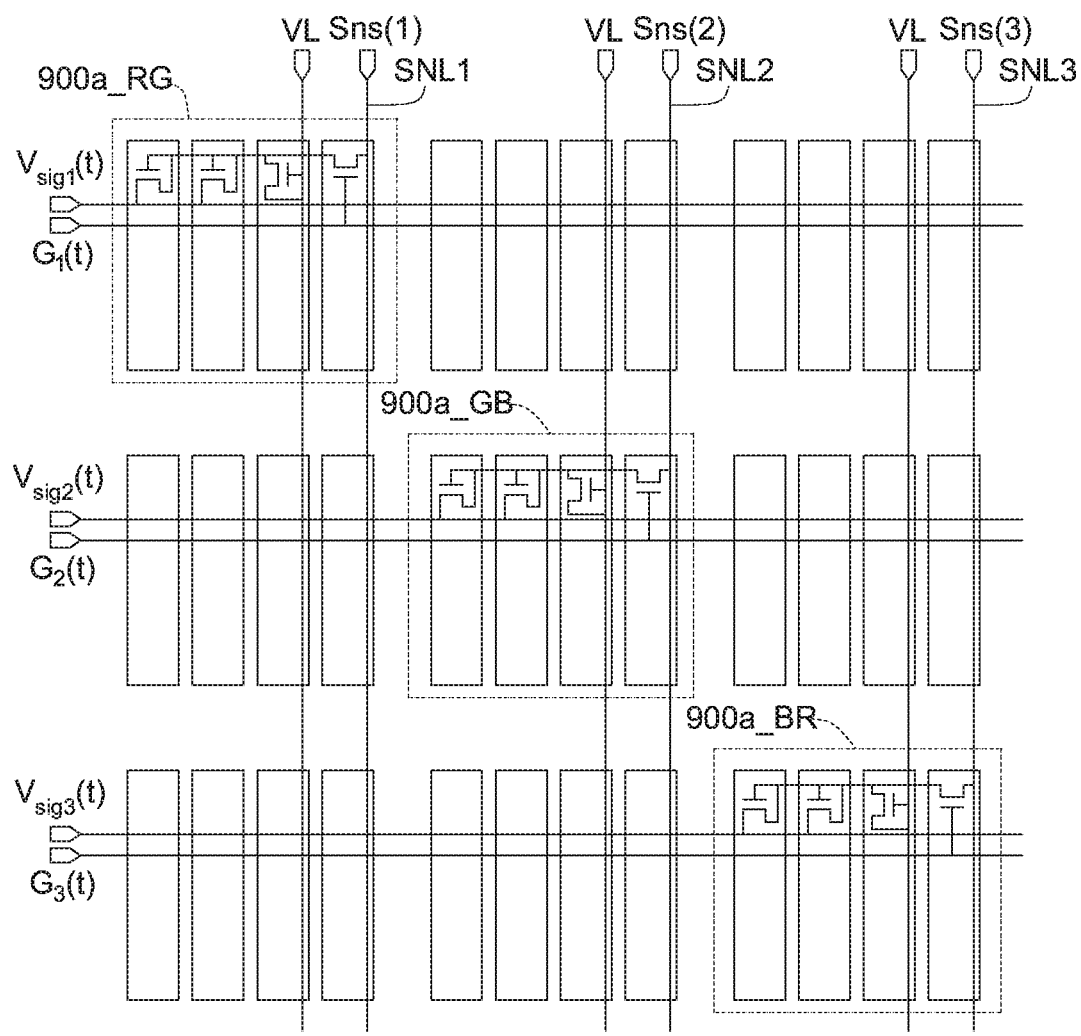
FIG. 9A illustrates an alternate example of an optical sensing circuit array using the optical sensing circuit of FIG. 2.
Figure 9B:
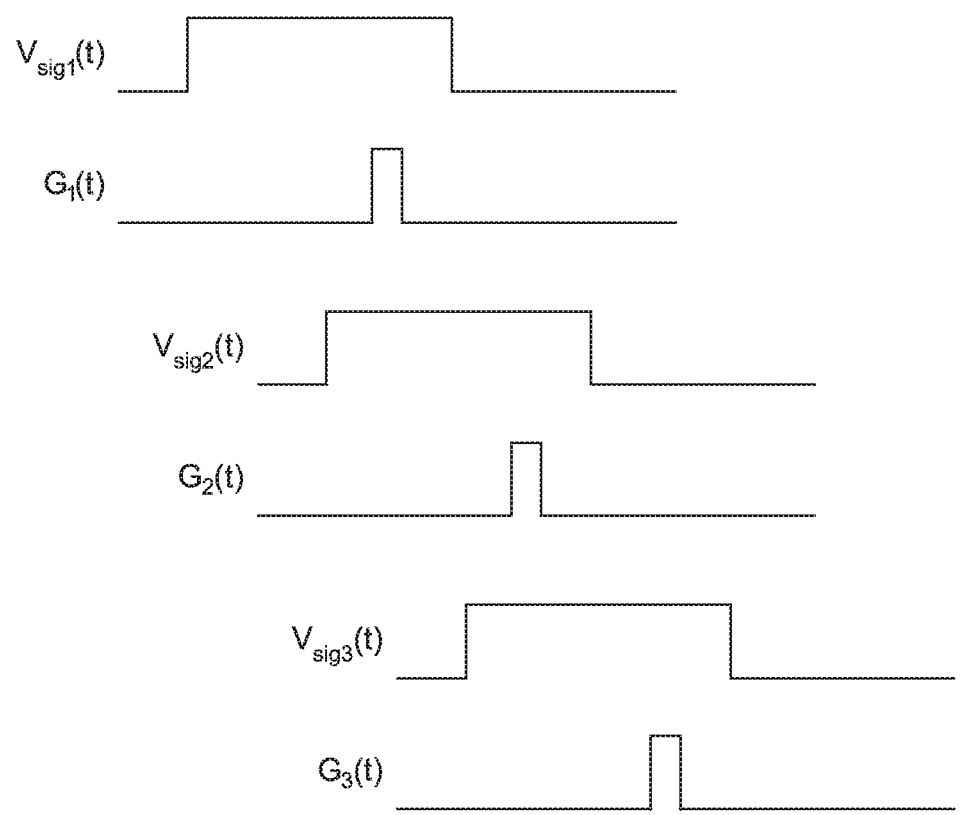
FIG. 9B is a waveform diagram of relevant signals used in the optical sensing circuit array of FIG. 9A.

Referring to FIG. 9A, an alternate example of an optical sensing circuit array using the optical sensing circuit 100*a* of FIG. 2 is illustrated. Referring to FIG. 9B, a waveform diagram of relevant signals used in the optical sensing circuit array 900 of FIG. 9A is shown. The optical sensing circuit array 900*a* of FIG. 9A is different from the optical sensing circuit array 600 of FIG. 6A in that the first signal line SL(1), the second signal line SL(2), and the third signal line SL(3) respectively receive the operating signals Vsig1 (*t*), Vsig2(*t*), and Vsig3(*t*), and the first scan line GL(1), the second scan line GL(2), and the third scan line GL(3) respectively receive the scan signals G1(*t*), G2(*t*) and G3(*t*). As shown in FIG. 9B, after the operating signals Vsig1(*t*), Vsig2(*t*), and Vsig3(*t*) respectively are enabled, the scan signals G1(*t*), G2(*t*), and G3(*t*), during the periods when the operating signals Vsig1(*t*), Vsig2(*t*), and Vsig3(*t*) are enabled, are sequentially enabled, the voltage of the capacitor of the first optical sensing circuit 900*a*_RG, the voltage of the capacitor of the second optical sensing circuit 900*a*_GB, and the voltage of the capacitor of the third optical sensing circuit 900*a*_BR are sequentially read through the sensing lines SNL1~SNL3 to determine the color of the illuminating light.

In above examples, each of the optical sensing circuit arrays 500*a*, 600*a*, 700*a*, 800*a*, and 900*a* has 3 optical sensing circuits, but the present disclosure is not limited thereto. Each of the optical sensing circuit arrays 500*a*, 600*a*, 700*a*, 800*a*, and 900*a* may have M*N optical sensing circuits, wherein M and N are positive integers. The first optical sensing circuit, the second optical sensing circuit, and the third optical sensing circuit are not limited to be arranged in the order of the R+G sensor, the G+B sensor, and the B+R sensor as shown in FIGS. 5A, 6A, 7A, 8A, and 9A. Each of the first optical sensing circuit, the second optical sensing circuit, and the third optical sensing circuit can be implemented by a sensor of other color.

Figure 10:
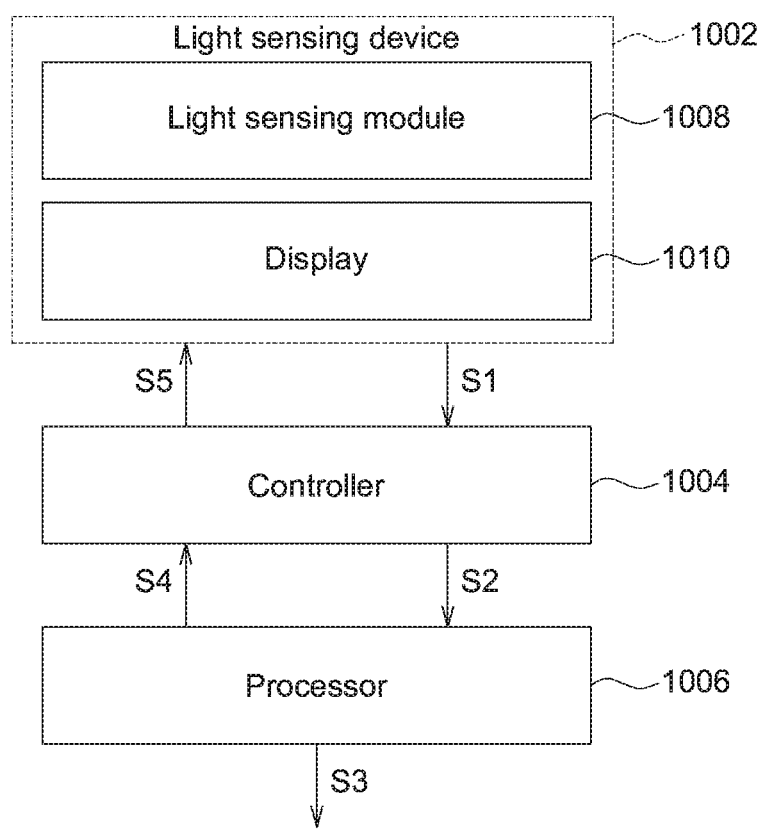
FIG. 10 illustrates an example of a light sensing system using the optical sensing circuit array.

Referring to FIG. 10, an example of a light sensing system using the optical sensing circuit array is illustrated. The light sensing system 1000 includes a light sensing device 1002, a controller 1004, and a processor 1006. The light sensing device 1002 includes a light sensing module 1008 and a display 1010. The light sensing module 1008 can be implemented by the optical sensing circuit array 500*a*, 600*a*, 700*a*, 800*a*, or 900*a*. The light sensing module 1008 has M*N optical sensing circuits, M and N are positive integers. The light sensing module 1008 outputs a signal 51 to the controller 1004 according to the sensing results. Then, the controller 1004 determines whether any light illuminates and the color of the illuminating light according to the signal 51, and outputs a signal S2 to the processor 1006. If no light illuminates, the processor 1006 outputs a signal S3. If a light illuminates, the processor outputs a signal S4 to the controller 1004. The controller 1004 generates a signal S5 to control the light sensing device 1002 according to the signal S4. The signal S5 is used to adjust relevant parameters of the display 1010.

Figure 11:
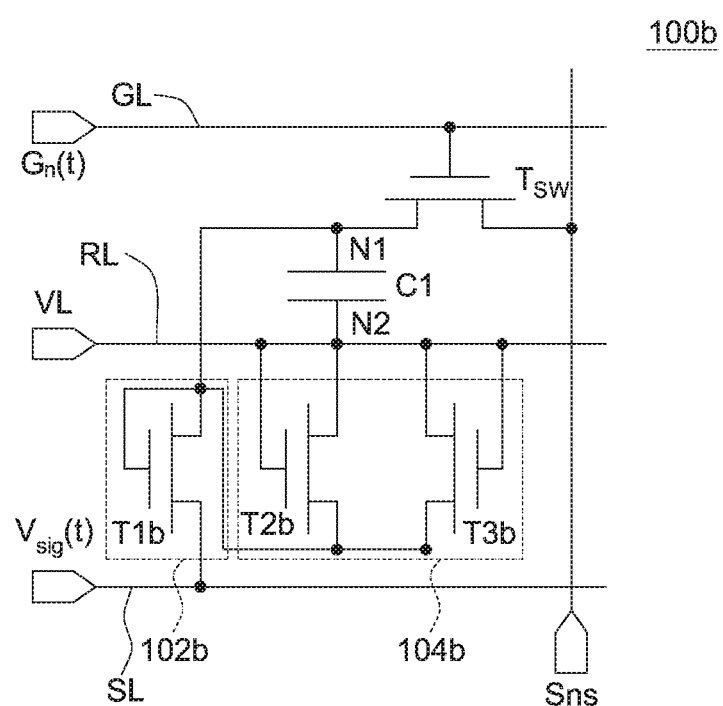
FIG. 11 is a circuit diagram of a second implementation of the optical sensing circuit.

The optical sensing circuit 100 of FIG. 1 can be implemented by different implementations. Referring to FIG. 11, a circuit diagram of a second implementation of the optical sensing circuit 100 is shown. The optical sensing circuit 100*b* includes a light sensing unit 102*b* and a compensation unit 104*b*. The light sensing unit 102*b* includes a first light sensing element T1*b*, and the compensation unit 104*b* has a second light sensing element T2*b* and a third light sensing element T3*b*. The first light sensing element T1*b*, the second light sensing element T2*b*, and the third light sensing element T3*b* can be implemented by a red light sensing element, a green light sensing element, and a blue light sensing element respectively. Thus, since the light sensing unit 102*b* includes the first light sensing element T1*b* capable of sensing a red light, the light sensing unit 102*b* can sense a red light, and the first color mentioned above is red. When a light illuminates the optical sensing circuit 100*b*, a red light component of the light corresponding to red causes the light sensing unit 102*b* to generate a first current, such as a light leakage current. Furthermore, since the compensation unit 104*b* has the second light sensing element T2*b* capable of sensing a green light and the third light sensing element T3*b* capable of sensing a blue light, the light from mixing the green light and the blue light is a cyan light, and the second color mentioned above is cyan. When a light illuminates the optical sensing circuit 100*b*, a cyan light component of the light corresponding to cyan causes the compensation unit 104*b* to generate a second current, such as a light leakage current. Since the cyan light contains a blue light and a green light, the blue light component and the green light component of the light corresponding to cyan also cause the compensation unit 104*b* to generate a second current.

Or, the first light sensing element T1*b* of the light sensing unit 102*b* and the second light sensing element T2*b* and the third light sensing element T3*b* of the compensation unit 104*b* also can be implemented by implemented by a green light sensing element, a blue light sensing element, and a red light sensing element respectively. Thus, since the light sensing unit 102*b* includes the first light sensing element T1*b* capable of sensing a green light, the light sensing unit 102*b* can sense a green light, and the first color mentioned above is green. When a light illuminates the optical sensing circuit 100*b*, a green light component of the light corresponding to green causes the light sensing unit 102*b* to generate a first current, such as a light leakage current. Furthermore, since the compensation unit 104*b* has the second light sensing element T2*b* capable of sensing a blue light and the third light sensing element T3*b* capable of sensing a red light, the light from mixing the blue light and the red light is a magenta light, and the second color mentioned above is magenta. When a light illuminates the optical sensing circuit, a magenta light component of the light corresponding to magenta causes the compensation unit 104*b* to generate a second current, such as a light leakage current. Since the magenta light contains a blue light and a red light, the blue light component and the red light component of the light corresponding to magenta also cause the compensation unit 104*b* to generate a second current.

Moreover, the first light sensing element T1*b* of the light sensing unit 102*b* and the second light sensing element T2*b* and the third light sensing element T3*b* of the compensation unit 104*b* also can be implemented by a blue light sensing element, a red light sensing element, and a green light sensing element respectively. Thus, since the light sensing unit 102*b* includes the first light sensing element T1*b* capable of sensing a blue light, the light sensing unit 102*b* can sense a blue light, and the first color mentioned above is blue. When a light illuminates the optical sensing circuit 100*b*, a blue light component of the light corresponding to blue causes the light sensing unit 102*b* to generate a first current, such as a light leakage current. Furthermore, since the compensation unit 104*b* has the second light sensing element T2*b* capable of sensing a red light and the third light sensing element T3*b* capable of sensing a green light, the second color mentioned above is yellow. When a light illuminates the optical sensing circuit 100*b*, a yellow light component of the light corresponding to yellow causes the compensation unit 104*b* to generate a second current, such as a light leakage current. Since the yellow light contains a red light and a green light, the red light component and the green light component of the light corresponding to yellow also cause the compensation unit 104*b* to generate a second current.

Furthermore, the capacitor C1 has a first end N1 and a second end N2. The first light sensing element T1b, the second light sensing element T2b, and the third light sensing element T3b can be implemented by diode-connected TFTs. That is, the gate of the TFT and one end (such as the drain) of the TFT are electrically connected to each other. The first light sensing element T1b (and one end (such as the drain) of the TFT) is electrically connected to the first end N1 of the capacitor C1; the gate of the second light sensing element T2b (and one end (such as the drain) of the TFT) and the gate of the third light sensing element T3b (and one end (such as the drain) of the TFT) are electrically connected to the second end N2 of the capacitor C1. The switching element Tsw is electrically connected to the first end N1 of the capacitor C1.

The other end (such as the source) of the first light sensing element T1b is electrically connected to a signal line SL to provide an operating signal Vsig(t) to the first light sensing element T1b. The switching element Tsw is electrically connected to a scan line GL to provide a scan signal Gn(t) to control the switching element Tsw. The gate and one end (such as the drain) of the second light sensing element T2b and the gate and one end (such as the drain) of the third light sensing element T3b are electrically connected to a reference voltage line RL to receive a reference voltage VL. The reference voltage VL is a low voltage Vlow.

Figure 12A:
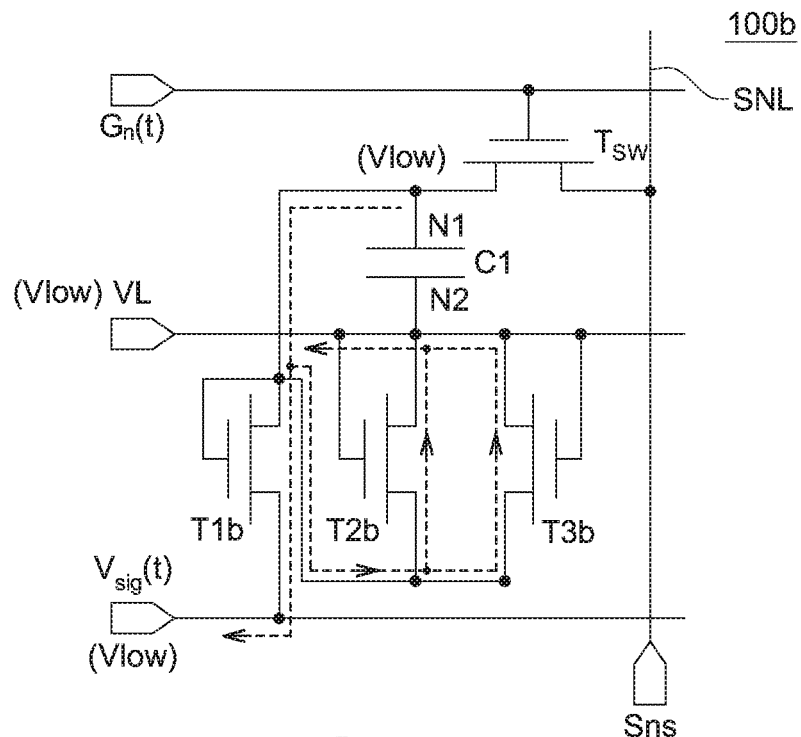
FIG. 12A is an operation diagram of the optical sensing circuit in FIG. 11 when the optical sensing circuit is reset.
Figure 12B:
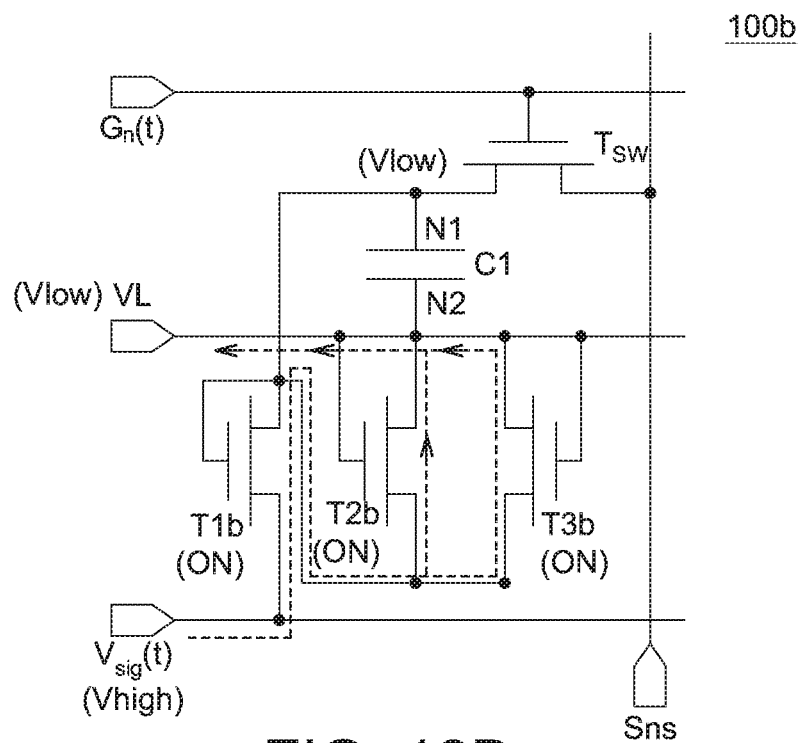
FIG. 12B is an operation diagram of the optical sensing circuit in FIG. 11 when the optical sensing circuit is illuminated by an ambient white light.
Figure 12C:
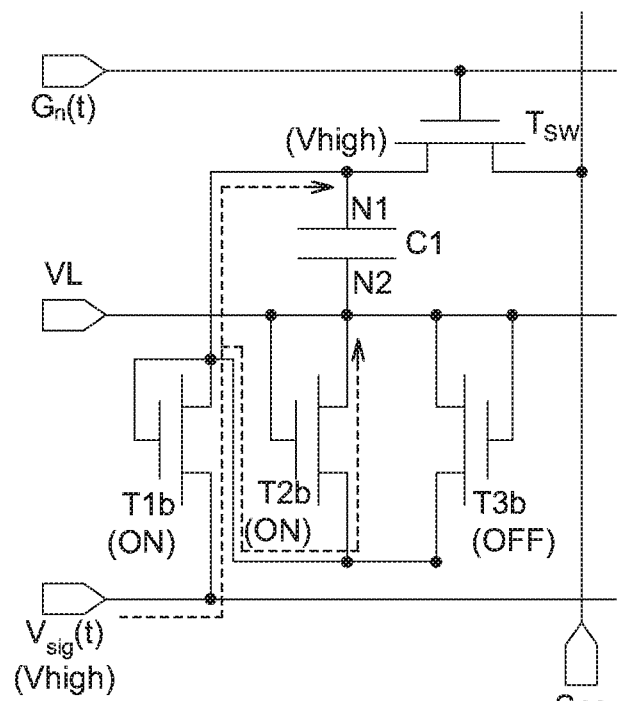
FIG. 12C is an operation diagram of the optical sensing circuit of FIG. 11 when the optical sensing circuit is illuminated by a yellow light.
Figure 12D:
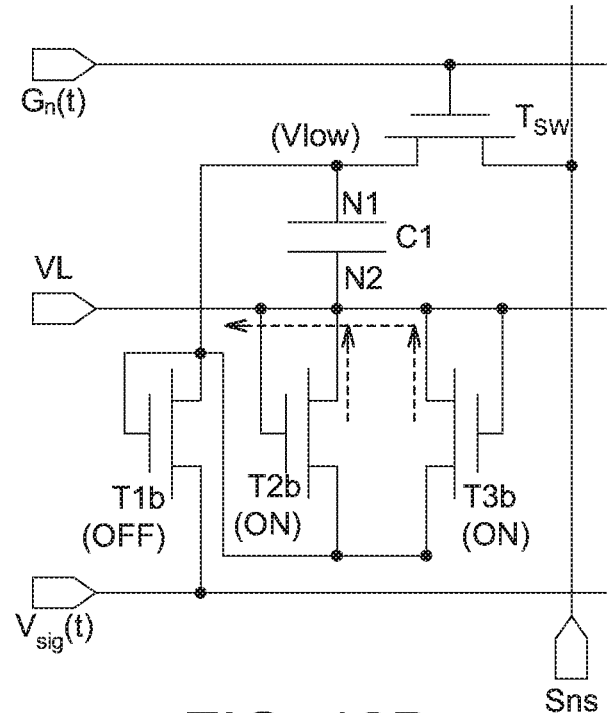
FIG. 12D is an operation diagram of the optical sensing circuit in FIG. 11 when the optical sensing circuit is illuminated by a cyan light.

The operations of the optical sensing circuit 100b are exemplified below. Referring to FIGS. 12A~12D, examples of the operations of the optical sensing circuit 100b are shown. Let the first light sensing element T1b of the light sensing unit 102b and the second light sensing element T2b and the third light sensing element T3b of the compensation unit 104b be a red light sensing element, a green light sensing element, and a blue light sensing element respectively. FIG. 12A is an operation diagram of the optical sensing circuit 100b in FIG. 11 when the optical sensing circuit 100b is reset. FIG. 12B is an operation diagram of the optical sensing circuit 100b in FIG. 11 when the optical sensing circuit 100b is illuminated by an ambient white light. FIG. 12C is an operation diagram of the optical sensing circuit 100b of FIG. 11 when the optical sensing circuit 100b is illuminated by a yellow light. FIG. 12D is an operation diagram of the optical sensing circuit 100b in FIG. 11 when the optical sensing circuit 100b is illuminated by a cyan light.

Refer to FIG. 12A. During the reset period P_reset, the operating signal Vsig(t) is disabled, and the scan signal Gn(t) is also disabled. For example, the operating signal Vsig(t) and the scan signal Gn(t) both have a low voltage Vlow. At this time, the charges of the capacitor C1 will be discharged through the first light sensing element T1b, the second light sensing element T2b, and the third light sensing element T3b, and the voltage of the first node N1 of the capacitor C1 will change to a low voltage Vlow. The discharging path is indicated by the dotted arrows of FIG. 12A.

Refer to FIG. 12B. During the sensing period P_sense, the operating signal Vsig(t) is enabled, and the scan signal Gn(t) is disabled. For example, the operating signal Vsig(t) has a high voltage Vhigh, and the scan signal Gn(t) has a low voltage Vlow. At this time, under the situation that the operating signal Vsig(t) is enabled, suppose the ambient white light illuminates the light sensing unit 102b and the compensation unit 104b, a red light component of the ambient white light causes the first light sensing element T1b of the light sensing unit 102b to generate a current, a green light component of the ambient white light causes the second light sensing element T2b of the compensation unit 104b to generate a current, and a blue light component of the ambient white light also causes the third light sensing element T3b of the compensation unit 104b to generate a current. Since the current generated by the first light sensing element T1b will flow towards the reference voltage line RL through the second light sensing element T2b and the third light sensing element T3b without charging the capacitor C1, the first node N1 of the capacitor C1 will remain at the low voltage Vlow. That is, the current generated by the second light sensing element T2b and the third light sensing element T3b will reduce the amount of the charging current when the current generated by the first light sensing element T1b charges the capacitor C1. The amount of the charging current of the capacitor C1 can be nearly 0 so as not to affect the voltage of the capacitor C1.

Refer to FIG. 12C. Similarly, during a sensing period P_sense, the operating signal Vsig(t) is enabled, and the scan signal Gn(t) is disabled. For example, the operating signal Vsig(t) has a high voltage Vhigh, and the scan signal Gn(t) has a low voltage Vlow. At this time, under the situation that the operating signal Vsig(t) is enabled, suppose the yellow light illuminates the light sensing unit 102b and the compensation unit 104b. Since the yellow light has a red light component and a green light component, the red light component of the yellow light causes the first light sensing element T1b of the light sensing unit 102b to generate a current, and the green light component of the yellow light causes the second light sensing element T2b of the compensation unit 104b to generate a current. Furthermore, since the yellow light does not have a blue light component, the third light sensing element T3b of the compensation unit 104b will not generate any current. The current generated by the first light sensing element T1b will charge the capacitor C1 and cause the first node N1 of the capacitor C1 to change to a high voltage Vhigh. The current generated by the second light sensing element T2b cannot offset the current generated by the first light sensing element T1b and cause the first node N1 of the capacitor C1 to change to a high voltage Vhigh.

Referring to FIG. 12D. Similarly, during a sensing period P_sense, the operating signal Vsig(t) is enabled, and the scan signal Gn(t) is disabled. For example, the operating signal Vsig(t) has a high voltage Vhigh, and the scan signal Gn(t) has a low voltage Vlow. At this time, under the situation that the operating signal Vsig(t) is enabled, suppose the cyan light illuminates the light sensing unit 102b and the compensation unit 104b. Since the cyan light has a green light component and a blue light component, wherein the green light component of the cyan light causes the second light sensing element T2b of the compensation unit 104b to generate a current, and the blue light component of the cyan light causes the second light sensing element T2b of the compensation unit 104b to generate a current. Since the cyan light does not have a red light component, the first light sensing element T1b of the light sensing unit 102b will not generate any current. The current generated by the second light sensing element T2b and the third light sensing element T3b will flow towards the reference voltage line RL without charging the capacitor C1, and the first node N1 of the capacitor C1 will remain at the low voltage Vlow.

Refer to FIG. 12A~12D. During the output period P_output, the scan signal Gn(t) is enabled and turns on the switching element Tsw. At this time, the voltage of the capacitor C1 (such as the voltage of the first node N1) is read as information for determining the color of the light. For example, during an output period P_output, the voltage N1 of the capacitor C1 of FIG. 12C is read by a controller (not shown) through the switching element Tsw and the sensing line SNL. Since the voltage N1 of the capacitor C1 has a high voltage Vhigh, the controller will determine that the optical sensing circuit 100b is turned on (ON). Since the voltage N1 of the capacitor C1 of FIG. 12D has a low voltage Vlow, the controller will determine that the optical sensing circuit 100b is turned off (OFF).

Let the optical sensing circuit 100b in which the first light sensing element T1b of the light sensing unit 102b is a red light sensing element be defined as an R sensor. Let the optical sensing circuit 100b in which the first light sensing element T1b of the light sensing unit 102b is a green light sensing element be defined as a G sensor. Let the optical sensing circuit 100b in which the first light sensing element T1b of the light sensing unit 102b is a blue light sensing element be defined as a B sensor. Thus, when an ambient white light, a red light, a green light, a blue light, a magenta light, a yellow light, and a cyan light respectively illuminate the R sensor, the G sensor, and B sensor, the ON/OFF state of the optical sensing circuit 100b is listed in Table 2.

TABLE 2

| Light source | R sensor | G sensor | B sensor | Determination results |
|---|---|---|---|---|
| Ambient white light | OFF | OFF | OFF | No signal |
| Red light | ON | OFF | OFF | Red light |
| Green light | OFF | ON | OFF | Green light |
| Blue light | OFF | OFF | ON | Blue light |
| Magenta light | ON | OFF | ON | Magenta light |
| Yellow light | ON | ON | OFF | Yellow light |
| Cyan light | OFF | ON | ON | Cyan light |

As listed in Table 2, the controller can determine the color of the light according to the determination results of respective ON/OFF states of the R sensor, the G sensor, and the B sensor. For example, when the optical sensing circuit 100b is illuminated by an ambient white light, the R sensor, the G sensor, and the B sensor all are turned off (OFF), and no determination results will be generated. When the R sensor, the G sensor, and the B sensor respectively are turned on (ON), turned off (OFF), and turned off (OFF), it can be determined that the light currently illuminating the sensors is a red light. When the R sensor, the G sensor, and the B sensor respectively are turned on (ON), turned on (ON), and turned off (OFF), it can be determined that the light currently illuminating the sensors is a yellow light.

Thus, under the situation that the R sensor, the G sensor, and the B sensor are disposed, the color of the light currently illuminating the R sensor, the G sensor, and the B sensor can be determined according to respective ON/OFF states of the R sensor, the G sensor, and the B sensor with reference to the relationship between the color of the illuminating light and the respective ON/Off state of the R sensor, the G sensor, and the B sensor as listed in Table 2. Unlike the conventional method which requires 6 sensors in the determination of 6 colors, the embodiment of the present disclosure only requires 3 sensors in the determination of 6 colors and therefore achieves the effects of saving elements, decreasing circuit complexity and reducing cost. Moreover, since the ambient white light is equivalent to the situation of no signal (no input of optical signals) in terms of determination results, the ambient white light will less affect the determination regarding the color of the illuminating light, and the S/N ratio will be effectively increased.

Figure 13A:
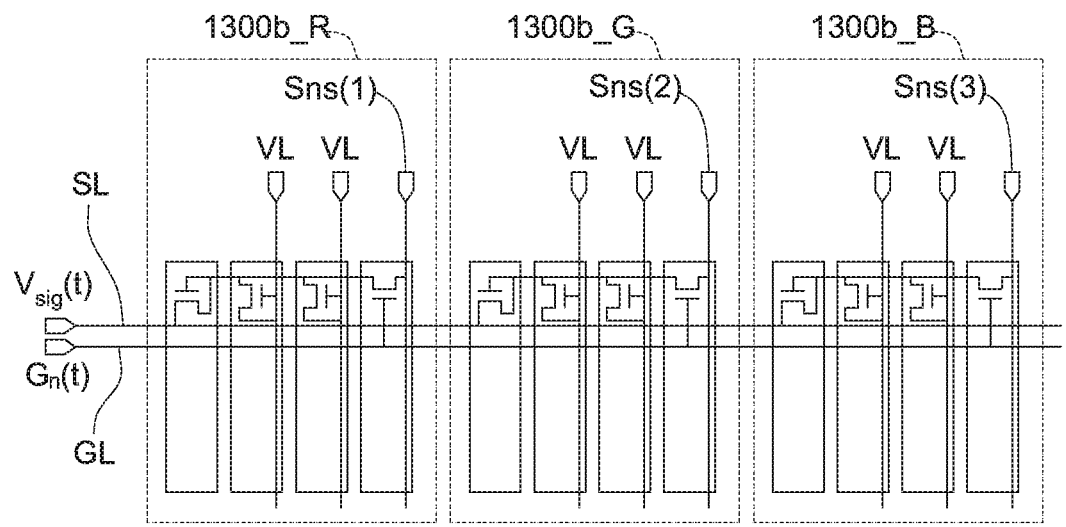
FIG. 13A illustrates an optical sensing circuit array using the optical sensing circuit of FIG. 11.

Referring to FIG. 13A, an optical sensing circuit array 1300 using the optical sensing circuit 100b of FIG. 11 is illustrated. The optical sensing circuit array 1300 includes a number of optical sensing circuits, at least one signal line SL, and at least one scan line GL. In FIG. 13A, take the optical sensing circuit array 1300 including a signal line SL and a scan line GL for example. The optical sensing circuits at least include a first optical sensing circuit 1300b_R, a second optical sensing circuit 1300b_G, and a third optical sensing circuit 1300b_B. The architecture of each optical sensing circuit is as shown in FIG. 11. To simplify the drawings, FIG. 13A illustrates only a part of the elements of the optical sensing circuit. In FIGS. 14A, 15A, 16A, and 17A, only a part of the elements of the optical sensing circuit are illustrated, and the architecture of each optical sensing circuit is as also shown in FIG. 11. At least one signal line SL is configured to provide at least one operating signal Vsig(t) to the light sensing units 102b of the first optical sensing circuit 1300b_R, the second optical sensing circuit 1300b_G, and the third optical sensing circuit 1300b_B. At least one scan line GL is configured to provide at least one scan signal to control the switching elements Tsw of the light sensing units 102b of the first optical sensing circuit 1300b_R, the second optical sensing circuit 1300b_G, and the third optical sensing circuit 1300b_B.

Figure 13B:
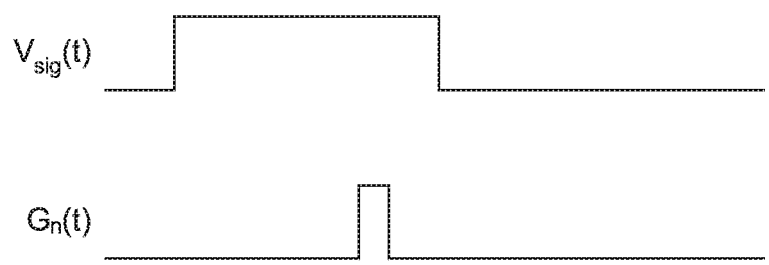
FIG. 13B is a waveform diagram of relevant signals used in the optical sensing circuit array of FIG. 13A.

Referring to FIG. 13B, a waveform diagram of relevant signals used in the optical sensing circuit array 1300 of FIG. 13A is shown. The first optical sensing circuit 1300b_R, the second optical sensing circuit 1300b_G, and the third optical sensing circuit 1300b_B can be implemented by an R sensor, a G sensor, and a B sensor respectively. Under the situation that the operating signal Vsig(t) is enabled, when a light illuminates the light sensing units 102b and the compensation units 104b of the first optical sensing circuit 1300b_R, the second optical sensing circuit 1300b_G, and the third optical sensing circuit 1300b_B, a light component of the light corresponding to red causes the light sensing unit 102b of the first optical sensing circuit 1300b_R to generate a first current, and a light component of the light corresponding to cyan causes the compensation unit 104b of the first optical sensing circuit 1300b_R to generate a second current. The second current reduces the amount of the charging current or the discharging current when the first current charges or discharges the corresponding capacitor C1. The first optical sensing circuit 1300b_R, the second optical sensing circuit 1300b_G, and the third optical sensing circuit 1300b_B are, for example, horizontally arranged and share the same signal line and the same scan line. When the scan signal Gn(t) is enabled and causes the switching element Tsw of the first optical sensing circuit 1300b_R to be turned on, the voltage of the capacitor C1 of the first optical sensing circuit 1300b_R is read as information for determining the color of the light. Thus, whether the first optical sensing circuit 1300b_R is turned on (ON) or turned off (OFF) can be determined. For example, when the voltage of the first node N1 of the capacitor C1 is greater than a threshold, it is determined that the first optical sensing circuit 1300b_R is turned on (ON). The operations of the second optical sensing circuit 1300b_G and the third optical sensing circuit 1300b_B are similar to the operation of the first optical sensing circuit 1300b_A, and the similarities are not repeated here.

Under the illumination of the lights of different colors, the first optical sensing circuit 1300b_R, the second optical sensing circuit 1300b_G, and the third optical sensing circuit 1300b_B will have different ON/OFF states. As indicted in Table 2, the color of the light can be determined according to a combination of respective ON/OFF states of the first optical sensing circuit 1300b_R, the second optical sensing circuit 1300b_G, and the third optical sensing circuit 1300b_B. For example, when the first optical sensing circuit 1300b_R, the second optical sensing circuit 1300b_G, and the third optical sensing circuit 1300b_B respectively are turned on (ON), turned off (OFF), and turned on (ON), it can be determined that the color of the light is a magenta light.

Figure 14A:
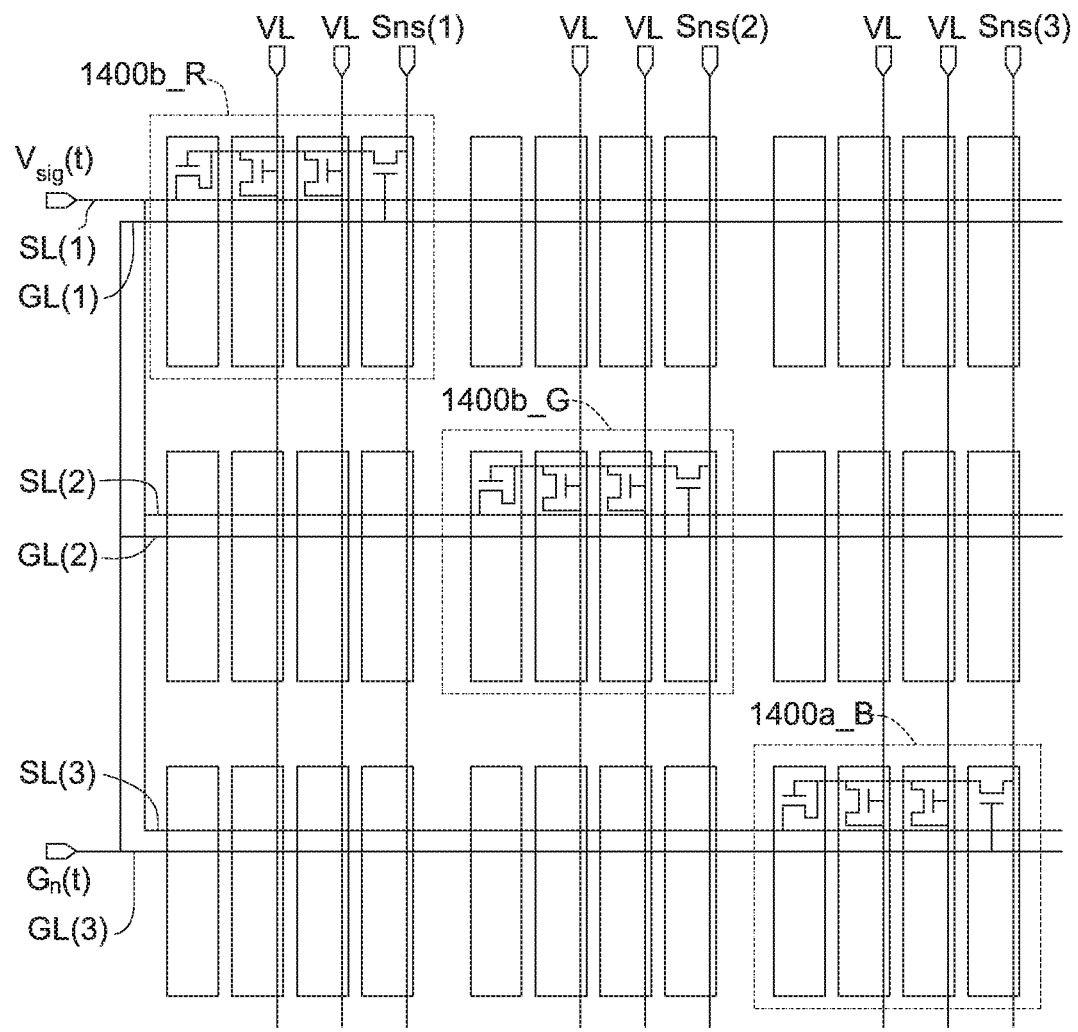
FIG. 14A illustrates another example of an optical sensing circuit array using the optical sensing circuit of FIG. 11.
Figure 14B:
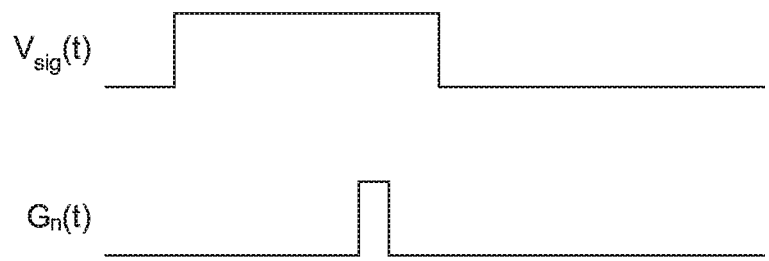
FIG. 14B is a waveform diagram of relevant signals used in the optical sensing circuit array of FIG. 14A.

Referring to FIG. 14A, another example of an optical sensing circuit array using the optical sensing circuit 100b of FIG. 11 is illustrated. Referring to FIG. 14B, a waveform diagram of relevant signals used in the optical sensing circuit array 1400 of FIG. 14A is shown. The at least one signal line includes a first signal line SL(1), a second signal line SL(2), and a third signal line SL(3). the first signal line SL(1), the second signal line SL(2), and the third signal line SL(3) are electrically connected to each other, and the same operating signal Vsig(t) is provided to the light sensing unit 102b of the first optical sensing circuit 1400b_R, the light sensing unit 102b of the second optical sensing circuit 1400b_G, and the light sensing unit 102b of the third optical sensing circuit 1400b_B. The at least one scan line includes a first scan line GL(1), a second scan line GL(2), and a third scan line GL(3). The first scan line GL(1), the second scan line GL(2), and the third scan line GL(3) are electrically connected to each other, and the same scan signal Gn(t) is provided to the switching element Tsw of the first optical sensing circuit 1400b_R, the switching element Tsw of the second optical sensing circuit 1400b_G, and the switching element Tsw of the third optical sensing circuit 1400b_B. The first optical sensing circuit 1400b_R, the second optical sensing circuit 1400b_G, and the third optical sensing circuit 1400b_B are obliquely arranged. The first optical sensing circuit 1400b_R, the second optical sensing circuit 1400b_G, and the third optical sensing circuit 1400b_B can be arranged in other orders in addition to the order indicated in FIG. 14A.

In the optical sensing circuit array 1400 of FIG. 14A, the first optical sensing circuit 1400b_R, the second optical sensing circuit 1400b_G, and the third optical sensing circuit 1400b_B respectively are located on different rows. The first optical sensing circuit 1400b_R is located to the left of the second optical sensing circuit 1400b_G, and the third optical sensing circuit 1400b_B is located to the right of the second optical sensing circuit 1400b_G, such that the first optical sensing circuit 1400b_R, the second optical sensing circuit 1400b_G, and the third optical sensing circuit 1400b_B are obliquely arranged. To determine the color of the light, the optical sensing circuit array 1400 of FIG. 14A needs to scan 3 optical sensing circuits located on different rows. The optical sensing circuit array 1400 of FIG. 14A advantageously reduces the amount of optical sensing circuits (that is, the amount of sensing points that need to be determined is reduced), the coupling problems caused by interleaved traces can be reduced.

Figure 15A:
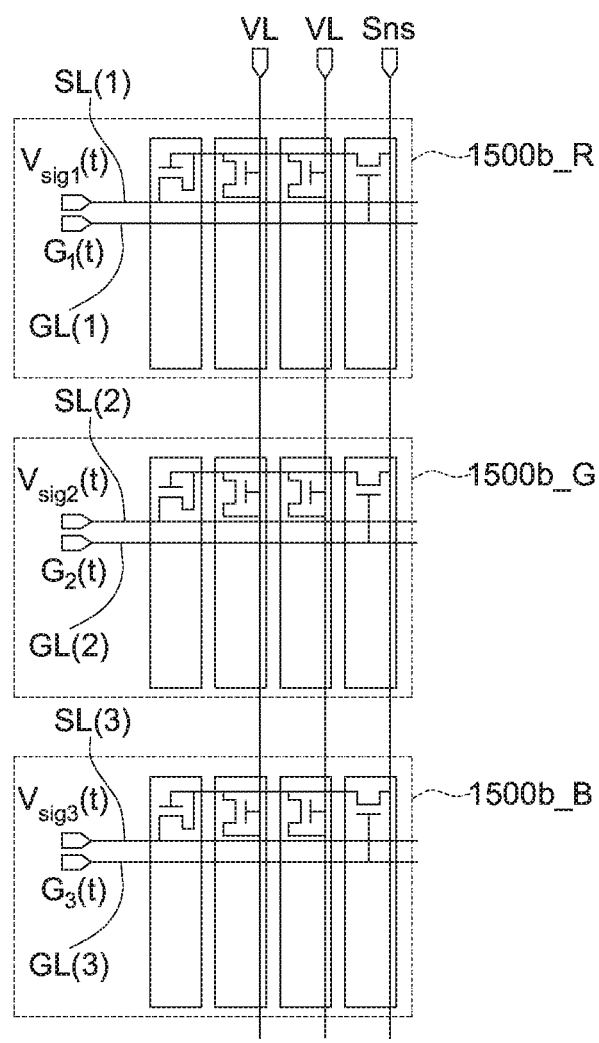
FIG. 15A illustrates an alternate example of an optical sensing circuit array using the optical sensing circuit of FIG. 11.
Figure 15B:
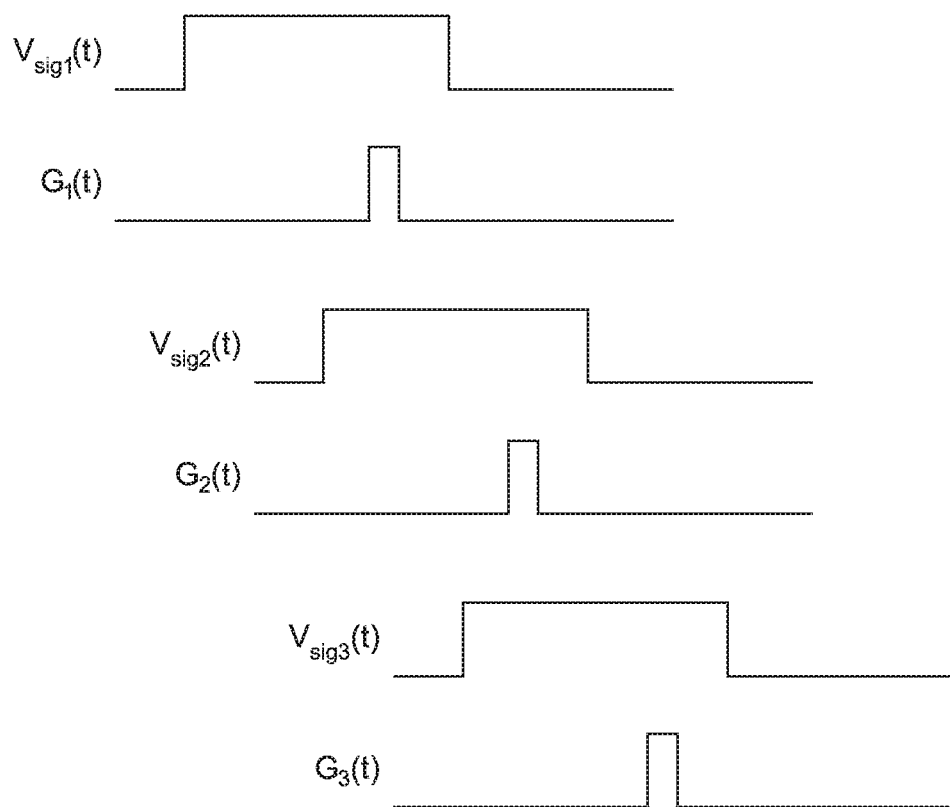
FIG. 15B is a waveform diagram of relevant signals used in the optical sensing circuit array of FIG. 15A.

Referring to FIG. 15A, an alternate example of an optical sensing circuit array using the optical sensing circuit 100b of FIG. 11 is illustrated. Referring to FIG. 15B, a waveform diagram of relevant signals used in the optical sensing circuit array 1500 of FIG. 15A is shown. The at least one signal line includes a first signal line SL(1), a second signal line SL(2), and a third signal line SL(3). The operating signals Vsig1(t), Vsig2(t) and Vsig3(t) respectively are applied to the light sensing unit 102b of the first optical sensing circuit 1500b_R, the light sensing unit 102b of the second optical sensing circuit 1500b_G, and the light sensing unit 102b of the third optical sensing circuit 1500b_B through the first signal line SL(1), the second signal line SL(2), and the third signal line SL(3). The at least one scan line includes a first scan line GL(1), a second scan line GL(2), and a third scan line GL(3). The scan signals G1(t), G2(t), and G3(t) respectively are applied to the switching element Tsw of the first optical sensing circuit 1500b_R, the switching element Tsw of the second optical sensing circuit 1500b_G, and the switching element Tsw of the third optical sensing circuit 1500b_B through the first scan line GL(1), the second scan line GL(2), and the third scan line GL(3). The first optical sensing circuit 1500b_R, the second optical sensing circuit 1500b_G, and the third optical sensing circuit 1500b_B are vertically arranged.

As shown in FIG. 15B, the operating signals Vsig1(t), Vsig2(t) and Vsig3(t) are sequentially enabled and cause the first optical sensing circuit 1500b_R, the second optical sensing circuit 1500b_G, and the third optical sensing circuit 1500b_B to sequentially sense optical signals. During the period when the operating signals Vsig1(t), Vsig2(t) and Vsig3(t) are enabled, the scan signals G1(t), G2(t), and G3(t) are sequentially enabled and the voltage of the capacitor of the first optical sensing circuit 1500b_R, the voltage of the capacitor of the second optical sensing circuit 1500b_G, and the voltage of the capacitor of the third optical sensing circuit 1500b_B are sequentially read for determining respective ON/OFF states of the first optical sensing circuit 1500b_R, the second optical sensing circuit 1500b_G, and the third optical sensing circuit 1500b_B. The color of the light illuminating the first optical sensing circuit 1500b_R, the second optical sensing circuit 1500b_G, and the third optical sensing circuit 1500b_B can be determined according to a combination of respective ON/OFF states of the first optical sensing circuit 1500b_R, the second optical sensing circuit 1500b_G, and the third optical sensing circuit 1500b_B as listed in Table 2.

Figure 16A:
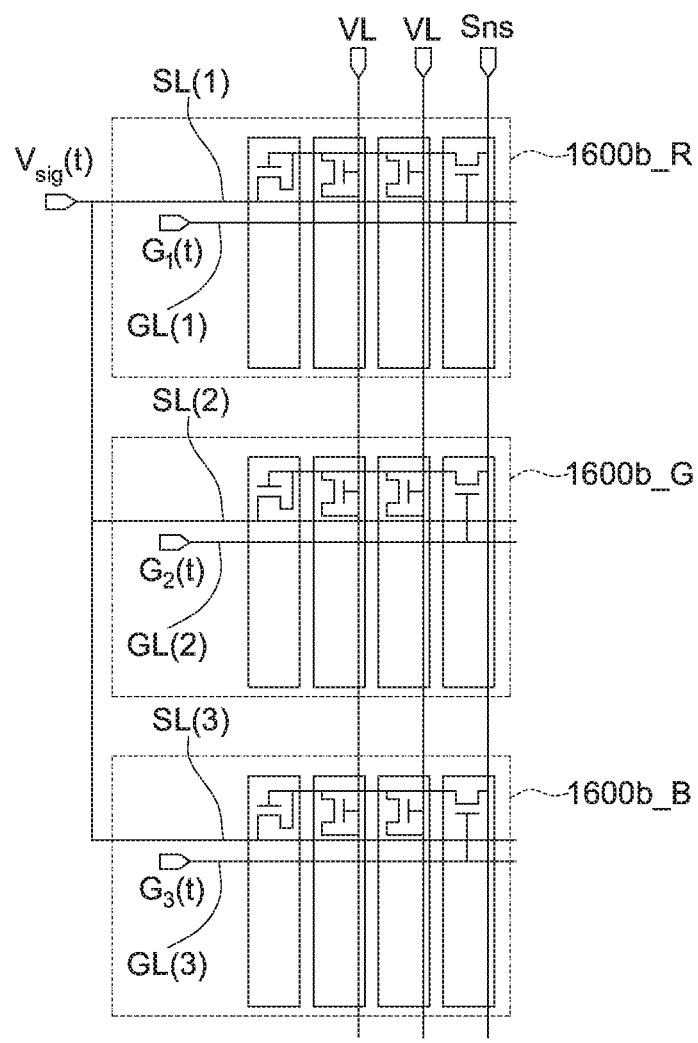
FIG. 16A illustrates another alternate example of an optical sensing circuit array using the optical sensing circuit of FIG. 11.
Figure 16B:
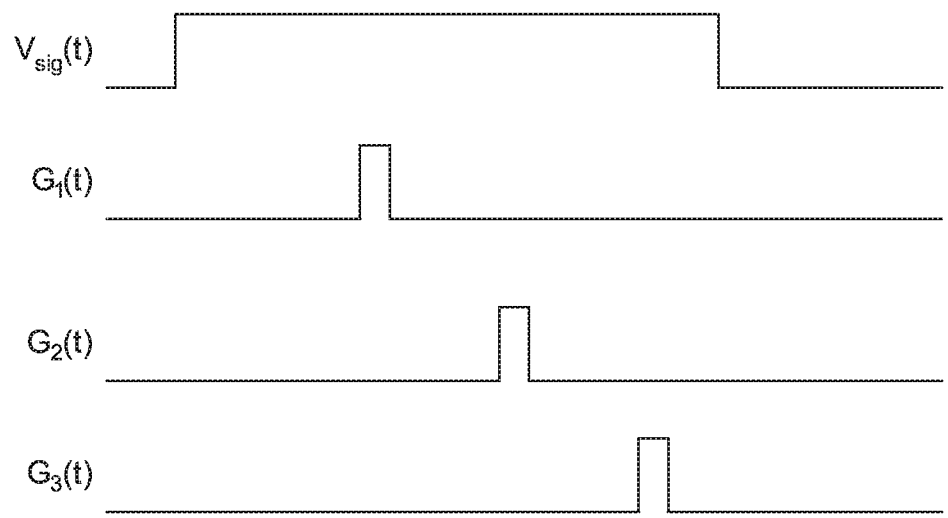
FIG. 16B is a waveform diagram of relevant signals used in the optical sensing circuit array of FIG. 16A.

Referring to FIG. 16A, another alternate example of an optical sensing circuit array using the optical sensing circuit 100b of FIG. 11 is illustrated. Referring to FIG. 16B, a waveform diagram of relevant signals used in the optical sensing circuit array 1600 of FIG. 16A is shown. The optical sensing circuit array 1600 of FIG. 16B is different from the optical sensing circuit array 1500 of FIG. 15B in that the first signal line SL(1), the second signal line SL(2), and the third signal line SL(3) are electrically connected to each other and receive the same operating signal Vsig(t). As shown in FIG. 16B, after the operating signal Vsig(t) is enabled, the scan signals G1(t), G2(t), and G3(t), during a period when the operating signal Vsig(t) is enabled, are sequentially enabled, and the voltage of the capacitor of the first optical sensing circuit 1600b_R, the voltage of the capacitor of the second optical sensing circuit 1600b_G, and the voltage of the capacitor of the third optical sensing circuit 1600b_B are sequentially read for determining the color of the illuminating light.

Figure 17A:
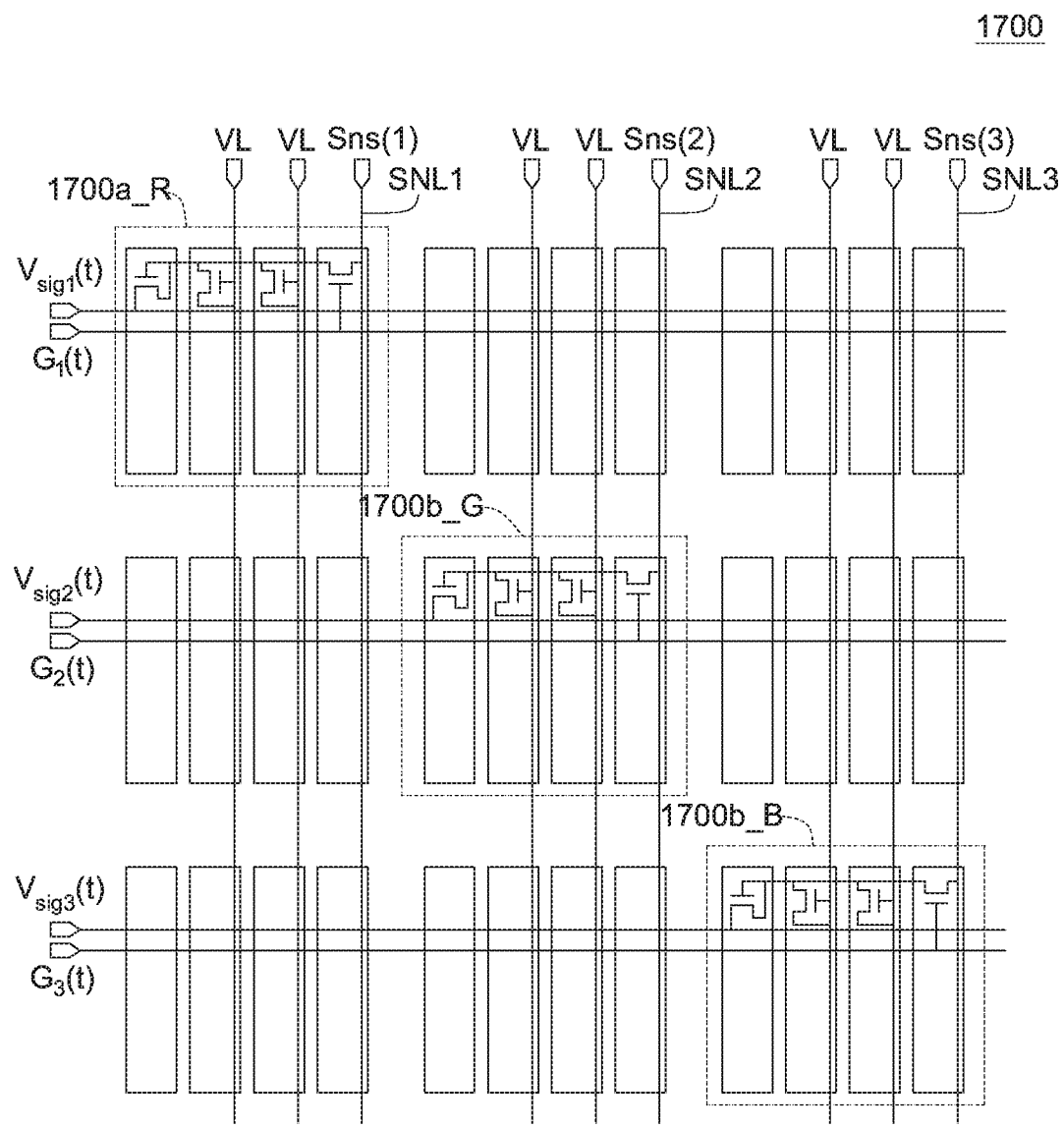
FIG. 17A illustrates an alternate example of an optical sensing circuit array using the optical sensing circuit of FIG. 11.
Figure 17B:
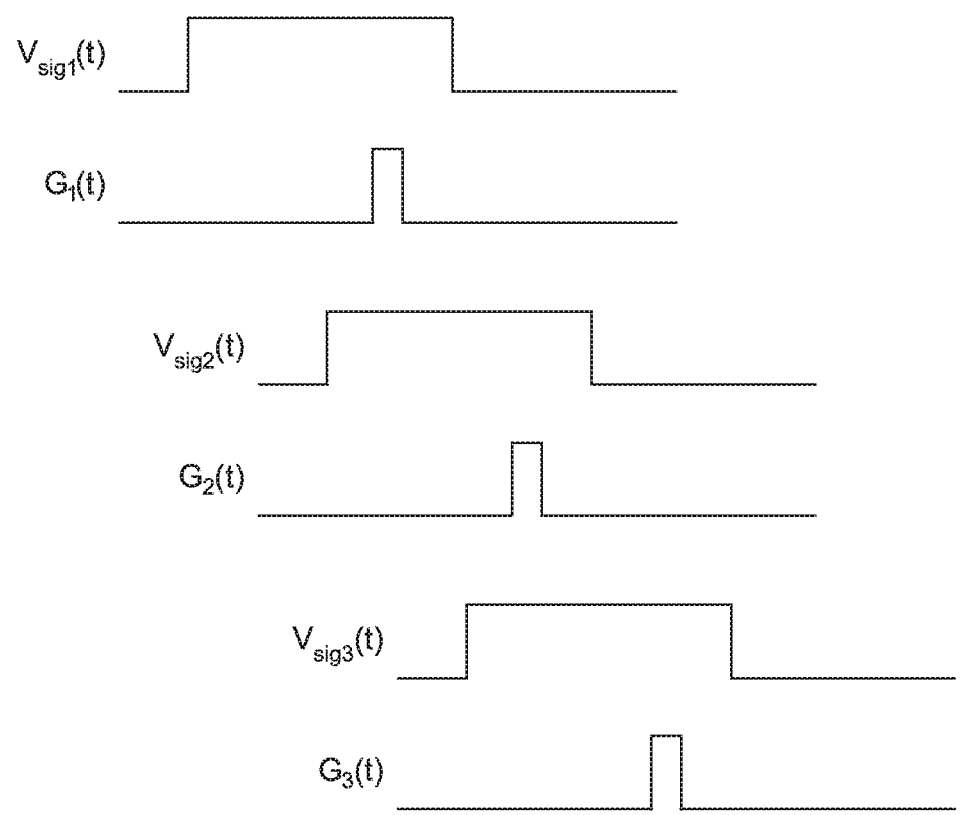
FIG. 17B is a waveform diagram of relevant signals used in the optical sensing circuit array of FIG. 17A.

Referring to FIG. 17A, an alternate example of an optical sensing circuit array using the optical sensing circuit 100b of FIG. 11 is illustrated. Referring to FIG. 17B, a waveform diagram of relevant signals used in the optical sensing circuit array 1700 of FIG. 17A is shown. The optical sensing circuit array 1700 of FIG. 17A is different from the optical sensing circuit array 1400 of FIG. 14A in that the first signal line SL(1), the second signal line SL(2), and the third signal line SL(3) respectively receive the operating signals Vsig1(t), Vsig2(t), and Vsig3(t), and the first scan line GL(1), the second scan line GL(2), and the third scan line GL(3) respectively receive the scan signals G1(t), G2(t) and G3(t). As shown in FIG. 17B, after the operating signals Vsig1(t), Vsig2(t), and Vsig3(t) respectively are enabled, the scan signals G1(t), G2(t), and G3(t), during a period when the operating signals Vsig1(t), Vsig2(t), and Vsig3(t) are enabled, are sequentially enabled, and the voltage of the capacitor of the first optical sensing circuit 1700b_R, the voltage of the capacitor of the second optical sensing circuit 1700b_G, and the voltage of the capacitor of the third optical sensing circuit 1700b_B are sequentially read through the sensing lines SNL1~SNL3 for determining the color of the illuminating light.

The light sensing modules of the light sensing system of FIG. 10 can also be implemented by the optical sensing circuit array 1300b, 1400b, 1500b, 1600b, or 1700b. Each of the optical sensing circuit arrays 1300b, 1400b, 1500b, 1600b, and 1700b is not limited to have 3 optical sensing circuits, and may have other amount of optical sensing circuits such as M*N, wherein M and N are positive integers. The first optical sensing circuit, the second optical sensing circuit, and the third optical sensing circuit are not limited to be arranged in the order of the R sensor, the G sensor, and the B sensor as shown in FIGS. 13A, 14A, 15A, 16A, and 17A. Each of the first optical sensing circuit, the second optical sensing circuit, and the third optical sensing circuit can be implemented by a sensor of other color.

Figure 18:
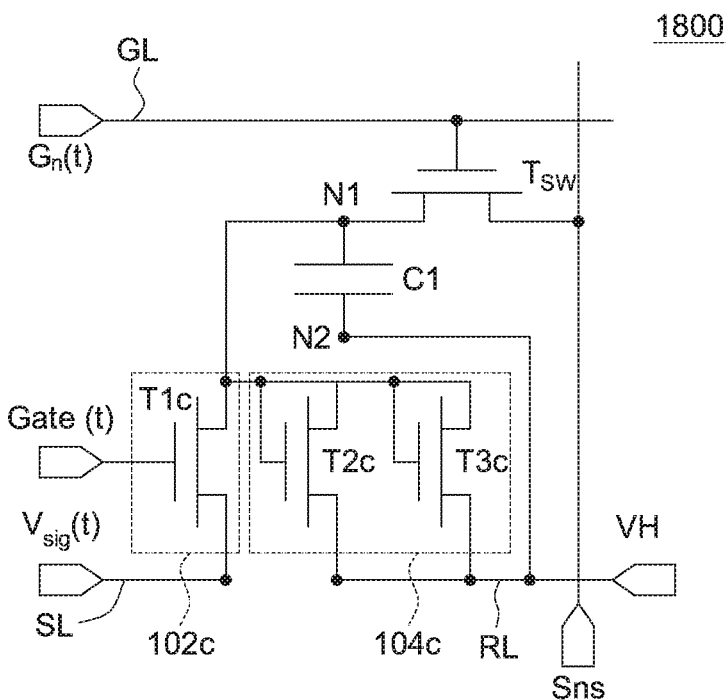
FIG. 18 is a circuit diagram of a third implementation of the optical sensing circuit.

The optical sensing circuit 100 of FIG. 1 can be implemented by different implementations. Referring to FIG. 18, a circuit diagram of a third implementation of the optical sensing circuit 100 is shown. The optical sensing circuit 1800 is an optical sensing circuit in a discharging mode. The light sensing unit 102c includes, for example, a first light sensing element T1c, and the compensation unit 104c has a second light sensing element T2c and a third light sensing element T3c. The first light sensing element T1c, the second light sensing element T2c, and the third light sensing element T3c can be implemented by a red light sensing element, a green light sensing element, and a blue light sensing element respectively. Thus, since the light sensing unit 102c includes the first light sensing element T1c capable of sensing a red light, the light sensing unit 102c can sense a red light, and the first color mentioned above is red. When a light illuminates the optical sensing circuit 1800, a red light component of the light corresponding to red causes the light sensing unit 102c to generate a first current, such as a light leakage current. Furthermore, since the compensation unit 104c has the second light sensing element T2c capable of sensing a green light and the third light sensing element T3c capable of sensing a blue light, and the light from mixing the green light and the blue light is a cyan light, the second color mentioned above is cyan. When a light illuminates the optical sensing circuit 1800, a cyan light component of the light corresponding to cyan causes the compensation unit 104c to generate a second current, such as a light leakage current. Since the cyan light contains a blue light and a green light, the blue light component and the green light component of the light corresponding to cyan also causes 104c to generate a second current.

Or, the first light sensing element T1c of the light sensing unit 102c and the second light sensing element T2c and the third light sensing element T3c of the compensation unit 104c also can be implemented by a green light sensing element, a blue light sensing element, and a red light sensing element respectively. Thus, since the light sensing unit 102c includes the first light sensing element T1c capable of sensing a green light, the light sensing unit 102c can sense a green light, and the first color mentioned above is green. When a light illuminates the optical sensing circuit 1800, a green light component of the light corresponding to green causes the light sensing unit 102c to generate a first current, such as a light leakage current. Furthermore, since the compensation unit 104c has the second light sensing element T2c capable of sensing a blue light and the third light sensing element T3c capable of sensing a red light, and the light from mixing the blue light and the red light is a magenta light, the second color mentioned above is magenta. When a light illuminates the optical sensing circuit 1800, a magenta light component of the light corresponding to magenta causes the compensation unit 104c to generate a second current, such as a light leakage current. Since the magenta light contains a blue light and a red light, the blue light component and the red light component of the light corresponding to magenta also cause the compensation unit 104c to generate a second current.

Moreover, the first light sensing element T1c of the light sensing unit 102c and the second light sensing element T2c and the third light sensing element T3c of the compensation unit 104c also can be implemented by a blue light sensing element, a red light sensing element, and a green light sensing element respectively. Thus, since the light sensing unit 102c includes the first light sensing element T1c capable of sensing a blue light, the light sensing unit 102c can sense a blue light, and the first color mentioned above is blue. When a light illuminates the optical sensing circuit 1800, a blue light component of the light corresponding to blue causes the light sensing unit 102c to generate a first current, such as a light leakage current. Furthermore, since the compensation unit 104c has the second light sensing element T2c capable of sensing a red light and the third light sensing element T3c capable of sensing a green light, the second color mentioned above is yellow. When a light illuminates the optical sensing circuit, a yellow light component of the light corresponding to yellow causes the compensation unit 104c to generate a second current, such as a light leakage current. Since the yellow light contains a red light and a green light, the red light component and the green light component of the light corresponding to yellow also cause the compensation unit 104c to generate a second current.

Furthermore, the capacitor C1 has a first end N1 and a second end N2. The first light sensing element T1c is controlled by a control signal Gate(t). The second light sensing element T2c and the third light sensing element T3c can be implemented by diode-connected TFTs. One end (such as the drain) of the first light sensing element T1c, one end (such as the drain) of the second light sensing element T2c, and one end (such as the drain) of the third light sensing element T3c are electrically connected to the first end N1 of the capacitor C1. The other end of the second light sensing element T2c and the other end of the third light sensing element T3c are electrically connected to the second end N2 of the capacitor C1. The switching element Tsw is electrically connected to the first end N1 of the capacitor C1.

The other end (such as the source) of the first light sensing element T1c is electrically connected to a signal line SL which provides an operating signal Vsig(t) to the first light sensing element T1c. The switching element Tsw is electrically connected to a scan line GL which provides a scan signal Gn(t) to control the switching element Tsw. The other end (such as the source) of the second light sensing element T2c and the other end (such as the source) of the third light sensing element T3c are electrically connected to a reference voltage line RL to receive a reference voltage VH. The reference voltage VH is, for example, a high voltage Vhigh.

Figure 19:
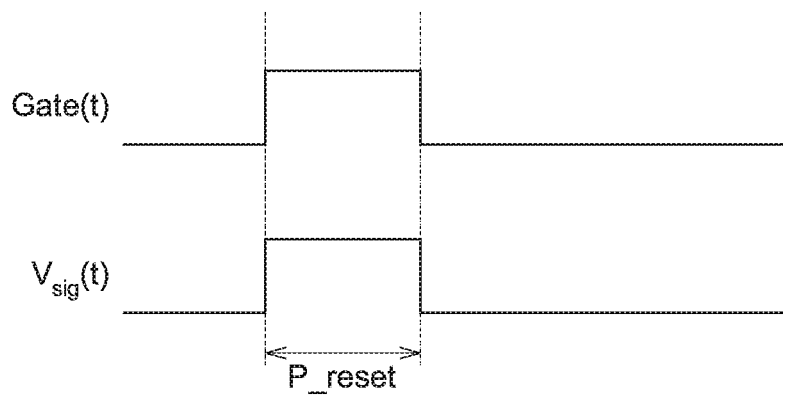
FIG. 19 is a waveform diagram of a control signal and an operating signal of the optical sensing circuit of FIG. 18 when the optical sensing circuit is in a reset period.

The operations of the optical sensing circuit 1800 of FIG. 18 are described below. Referring to FIG. 19, a waveform diagram of a control signal Gate(t) and an operating signal Vsig(t) of the optical sensing circuit 1800 of FIG. 18 when the optical sensing circuit is in a reset period P_reset is shown. During the reset period P_reset, the control signal Gate(t) and the operating signal Vsig(t) both are enabled and have a high voltage Vhigh. For example, the operating signal Vsig(t) having a high voltage Vhigh charges the node N1 of the capacitor C1 through the first light sensing element T1c which is turned on. At this time, the node N1 of the capacitor C1 has a high voltage Vhigh. When a light illuminates the optical sensing circuit 1800, the leakage current generated by the first light sensing element T1c will discharge the capacitor C1 and decrease the voltage of the node N1 of the capacitor C1. At this time, when a light illuminates the optical sensing circuit 1800, the leakage current generated by the second light sensing element T2c or the third light sensing element T3c will charge the capacitor C1 and increase the voltage of the node N1 of the capacitor C1. The relation between the color of the illuminating light and the first light sensing element T1c, the second light sensing element T2c, and the third light sensing element T3c, is similar to the relation between the color of the illuminating light and the first light sensing element T1b, the second light sensing element T2b, and the third light sensing element T3b of FIG. 11. The operations of the first light sensing element T1c, the second light sensing element T2c, and the third light sensing element T3c are also similar to the operations of the first light sensing element T1b, the second light sensing element T2b, and the third light sensing element T3b of FIG. 11, and the similarities are not repeated here.

According to another embodiment of the present disclosure, a method for determining light color by using the optical sensing circuit array is provided. The method includes the following steps. Firstly, at least one of the at least one operating signal is enabled. When a light illuminates the light sensing unit and the compensation unit corresponding to at least one of the at least one enabled operating signal, a first light component of the light corresponding to the first color causes the corresponding light sensing unit to generate a first current, and a second light component of the light corresponding to the second color causes the corresponding compensation unit to generate a second current. The second current reduces the amount of the charging current or the discharging current when the first current charges or discharges the corresponding capacitor.

Then, at least one of the at least one scan signal is enabled, and the switching element corresponding to at least one of at least one enabled scan signal is turned on to read the voltage of the corresponding capacitor.

Afterwards, whether the color of the light is at least one of more than three colors is determined according to the voltage of the capacitor of the first optical sensing circuit, the voltage of the capacitor of the second optical sensing circuit, and the voltage of the capacitor of the third optical sensing circuit.

Unlike the conventional method which requires 6 sensors in the determination of 6 colors, the optical sensing circuit and the optical sensing circuit array, and the method for determining light color by using the same of the present disclosure only require 3 sensors in the determination of 6 colors, and therefore achieve the effects of saving elements, decreasing circuit complexity and reducing cost. Moreover, since the ambient white light is equivalent to the situation of no signal (no input of optical signals) in terms of determination results, the ambient white light will less affect the determination regarding the color of the illuminating light, and the S/N ratio will be effectively increased.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical sensing circuit, comprising:
   a capacitor;
   a light sensing unit, electrically connected to the capacitor and configured to sense a first color;
   a compensation unit, electrically connected to the capacitor and configured to sense a second color; and
   a switching element, electrically connected to the capacitor;
   wherein when a light illuminates the light sensing unit and the compensation unit, a first light component of the light corresponding to the first color causes the light sensing unit to generate a first current, and a second light component of the light corresponding to the second color causes the compensation unit to generate a second current;
   wherein when the second current is substantially zero, a charging current or a discharging current corresponding to the current amount of the first current charges or discharges the capacitor;
   wherein when the second current is not zero, the charging current or the discharging current corresponding to the current amount of the first current reduced by the second current charges or discharges the capacitor;
   wherein when the switching element is turned on, the voltage of the capacitor is read as information for determining the color of the light by a controller;
   wherein the light sensing unit and the compensation unit are disposed in a first configuration or a second configuration;
   wherein in the first configuration, the light sensing unit comprises a first light sensing element and a second light sensing element, and the compensation unit comprises a third light sensing element;
   wherein in the second configuration, the light sensing unit comprises the first light sensing element, the compensation unit comprises the second light sensing element and the third light sensing element;
   wherein the first light sensing element is capable of sensing one of a red light, a green light, and a blue light, the second light sensing element is capable of sensing another of the red light, the green light, and the blue light, and the third light sensing element is capable of sensing the other of the red light, the green light, and the blue light;
   wherein in the first configuration, the first color is formed by mixing two of the red light, the green light, and the blue light corresponding to the first light sensing element and the second light sensing element;
   wherein in the second configuration, the first color is corresponding to one of the red light, the green light, and the blue light corresponding to the first light sensing element.

2. The optical sensing circuit according to claim 1, wherein the first color is yellow, and the second color is blue, or the first color is cyan, and the second color is red, or the first color is magenta, and the second color is green.

3. The optical sensing circuit according to claim 1, wherein the light sensing unit comprises the first light sensing element and the second light sensing element, and the compensation unit comprises the third light sensing element, the first to the third light sensing elements are implemented by a red light sensing element, a green light sensing element, and a blue light sensing element respectively, or the first to the third light sensing elements are implemented by a green light sensing element, a blue light sensing element, and a red light sensing element respectively, or the first to the third light sensing elements are implemented by a blue light sensing element, a red light sensing element, and a green light sensing element respectively.

4. The optical sensing circuit according to claim 3, wherein the capacitor has a first end and a second end, the first light sensing element, the second light sensing element and the third light sensing element are diode-connected thin-film transistors (TFTs), the gates of the first light sensing element and the second light sensing element are electrically connected to the first end of the capacitor, the third light sensing element is electrically connected to the second end of the capacitor, and the switching element is electrically connected to the first end of the capacitor.

5. The optical sensing circuit according to claim 1, wherein the first color is red and the second color is cyan, or the first color is green and the second color is magenta, or the first color is blue and the second color is yellow.

6. The optical sensing circuit according to claim 1, wherein the light sensing unit comprises the first light sensing element and the compensation unit has the second light sensing element and the third light sensing element, the first to the third light sensing elements are implemented by a red light sensing element, a green light sensing element, and a blue light sensing element respectively, or the first to the third light sensing elements are implemented by a green light sensing element, a blue light sensing element, and a red light sensing element respectively, or the first to the third light sensing elements are implemented by a blue light sensing element, a red light sensing element, and a green light sensing element respectively.

7. The optical sensing circuit according to claim 6, wherein the capacitor has a first end and a second end, the first light sensing element, the second light sensing element and the third light sensing element are diode-connected thin-film transistors (TFTs), the gate of the first light sensing element is electrically connected to the first end of the capacitor, the gates of the second light sensing element and the third light sensing element is electrically connected to the second end of the capacitor, and the switching element is electrically connected to the first end of the capacitor.

8. The optical sensing circuit according to claim 6, wherein the capacitor has a first end and a second end, the first light sensing element is controlled by a control signal, the second light sensing element and the third light sensing element both are diode-connected thin-film transistors (TFTs), one end of the first light sensing element, one end and the gate of the second light sensing element, and one end and the gate of the third light sensing element are electrically connected to the first end of the capacitor, the other end of the second light sensing element and the other end of the third light sensing element are electrically connected to the second end of the capacitor, the switching element is electrically connected to the first end of the capacitor.

9. An optical sensing circuit array, comprising:
a plurality of optical sensing circuits, at least comprising a first optical sensing circuit, a second optical sensing circuit, and a third optical sensing circuit, wherein each optical sensing circuit comprises:
a capacitor;
a light sensing unit, electrically connected to the capacitor and configured to sense a first color;
a compensation unit, electrically connected to the capacitor and configured to sense a second color; and
a switching element, electrically connected to the capacitor;
at least one signal line, configured to provide at least one operating signal to the light sensing unit of the first optical sensing circuit, the light sensing unit of the second optical sensing circuit, and the light sensing unit of the third optical sensing circuit; and
at least one scan line, configured to provide at least one scan signal to control the switching element of the first optical sensing circuit, the switching element of the second optical sensing circuit, and the switching element of the third optical sensing circuit;
wherein under the situation that one of the at least one operating signal is enabled, when a light illuminates a corresponding light sensing unit and a corresponding compensation unit, a first light component of the light corresponding to the first color causes the corresponding light sensing unit to generate a first current, and a second light component of the light corresponding to the second color causes the corresponding compensation unit to generate a second current;
wherein when the second current is substantially zero, the charging current or the discharging current corresponding to the current amount of the first current charges or discharges a corresponding capacitor;
wherein when the second current is not zero, the charging current or the discharging current corresponding to the current amount of the first current reduced by the second current charges or discharges the corresponding capacitor;
wherein when one of the at least one scan signal is enabled and causes a corresponding switching element to be turned on, the voltage of the corresponding capacitor is read as information for determining the color of the light by a controller;
wherein the corresponding light sensing unit and the corresponding compensation unit are disposed in a first configuration or a second configuration;
wherein in the first configuration, the corresponding light sensing unit comprises a first light sensing element and a second light sensing element, and the corresponding compensation unit comprises a third light sensing element;
wherein in the second configuration, the corresponding light sensing unit comprises the first light sensing element, the corresponding compensation unit comprises the second light sensing element and the third light sensing element;
wherein the first light sensing element is capable of sensing one of a red light, a green light, and a blue light, the second light sensing element is capable of sensing another of the red light, the green light, and the blue light, and the third light sensing element is capable of sensing the other of the red light, the green light, and the blue light;
wherein in the first configuration, the first color is formed by mixing two of the red light, the green light, and the blue light corresponding to the first light sensing element and the second light sensing element;

wherein in the second configuration, the first color is corresponding to one of the red light, the green light, and the blue light corresponding to the first light sensing element.

10. The optical sensing circuit array according to claim 9, wherein the light sensing unit of the first optical sensing circuit is configured to sense a yellow light, the compensation unit of the first optical sensing circuit is configured to sense the blue light, the light sensing unit of the second optical sensing circuit is configured to sense a cyan light, the compensation unit of the second optical sensing circuit is configured to sense the red light, the light sensing unit of the third optical sensing circuit is configured to sense a magenta light, and the compensation unit of the third optical sensing circuit is configured to sense the green light.

11. The optical sensing circuit array according to claim 9, wherein each of the light sensing units comprises the first light sensing element and the second light sensing element, and each of the compensation units comprises the third light sensing element, the first to the third light sensing elements of the first optical sensing circuit are implemented by a red light sensing element, a green light sensing element, and a blue light sensing element respectively, the first to the third light sensing elements of the second optical sensing circuit are implemented by a green light sensing element, a blue light sensing element, and a red light sensing element respectively, the first to the third light sensing elements of the third optical sensing circuit are implemented by a blue light sensing element, a red light sensing element, and a green light sensing element respectively.

12. The optical sensing circuit array according to claim 11, wherein each of the capacitors has a first end and a second end, each of the first light sensing elements, each of the second light sensing elements and each of the third light sensing elements are diode-connected thin-film transistors (TFTs), the gate of each of the first light sensing elements and the gate of each of the second light sensing elements are electrically connected to the first end of the corresponding capacitor, each of the third light sensing elements is electrically connected to the second end of the corresponding capacitor, each of the switching elements is electrically connected to the first end of the corresponding capacitor.

13. The optical sensing circuit array according to claim 9, wherein the light sensing unit of the first optical sensing circuit is configured to sense the red light, and the compensation unit of the first optical sensing circuit is configured to sense a cyan light, the light sensing unit of the second optical sensing circuit is configured to sense the green light, and the compensation unit of the second optical sensing circuit is configured to sense a magenta light, the light sensing unit of the third optical sensing circuit is configured to sense the blue light, and the compensation unit of the third optical sensing circuit is configured to sense a yellow light.

14. The optical sensing circuit array according to claim 9, wherein each of the light sensing units comprises the first light sensing element, and each of the compensation units has the second light sensing element and the third light sensing element, the first to the third light sensing elements of the first optical sensing circuit are implemented by a red light sensing element, a green light sensing element, and a blue light sensing element respectively, the first to the third light sensing elements of the second optical sensing circuit are implemented by a green light sensing element, a blue light sensing element, and a red light sensing element respectively, the first to the third light sensing elements of the third optical sensing circuit are implemented by a blue light sensing element, a red light sensing element, and a green light sensing element respectively.

15. The optical sensing circuit array according to claim 14, wherein each of the capacitors has a first end and a second end, each of the first light sensing elements, each of the second light sensing elements and each of the third light sensing elements are diode-connected thin-film transistors (TFTs), the gate of each of the first light sensing elements is electrically connected to the first end of the corresponding capacitor, the gate of each of the second light sensing elements and the gate of each of the third light sensing elements are electrically connected to the second end of the corresponding capacitor, each of the switching elements is electrically connected to the first end of the corresponding capacitor.

16. The optical sensing circuit array according to claim 14, wherein each of the capacitors has a first end and a second end, each of the first light sensing elements is controlled by a corresponding control signal, each of the second light sensing elements and each of the third light sensing elements are diode-connected thin-film transistors (TFTs), one end of each of the first light sensing elements, one end and the gate of each of the second light sensing elements and one end and the gate of each of the third light sensing elements are electrically connected to the first end of the corresponding capacitor, the other end of each of the second light sensing elements and the other end of each of the third light sensing elements are electrically connected to the second end of the corresponding capacitor, each of the switching elements is electrically connected to the first end of the corresponding capacitor.

17. The optical sensing circuit array according to claim 9, wherein the at least one signal line comprises a first signal line, a second signal line, and a third signal line respectively configured to provide a first operating signal, a second operating signal, a third operating signal to the light sensing unit of the first optical sensing circuit, the light sensing unit of the second optical sensing circuit, and the light sensing unit of the third optical sensing circuit, or the at least one signal line comprises a fourth signal line configured to provide a fourth operating signal to the light sensing unit of the first optical sensing circuit, the light sensing unit of the second optical sensing circuit, and the light sensing unit of the third optical sensing circuit.

18. The optical sensing circuit array according to claim 9, wherein the at least one scan line comprises a first scan line, a second scan line, and a third scan line respectively configured to provide a first scan signal, a second scan signal, a third scan signal to the switching element of the first optical sensing circuit, the switching element of the second optical sensing circuit, and the switching element of the third optical sensing circuit, or the at least one scan line comprises a fourth scan line configured to provide a fourth scan signal to the switching element of the first optical sensing circuit, the switching element of the second optical sensing circuit, and the switching element of the third optical sensing circuit.

19. The optical sensing circuit array according to claim 9, wherein the first optical sensing circuit, the second optical sensing circuit, and the third optical sensing circuit are horizontally arranged, obliquely arranged or vertically arranged, the first optical sensing circuit, the second optical sensing circuit, and the third optical sensing circuit are coupled to the same scan line or different scan lines, the first optical sensing circuit, the second optical sensing circuit, and the third optical sensing circuit are coupled to the same signal line or different signal lines.

20. A method for determining light color using the optical sensing circuit array according to claim 9, wherein the method comprises:

enabling at least one of the at least one operating signal, wherein when a light illuminates the light sensing unit and the compensation unit corresponding to at least one of the at least one enabled operating signal, a first light component of the light corresponding to the first color causes the corresponding light sensing unit to generate the first current, and a second light component of the light corresponding to the second color causes the corresponding compensation unit to generate the second current, wherein when the second current is substantially zero, the charging current or the discharging current corresponding to the current amount of the first current charges or discharges the corresponding capacitor, when the second current is not zero, the charging current or the discharging current corresponding to the current amount of the first current reduced by the second current charges or discharges the corresponding capacitor;

enabling at least one of the at least one scan signal and causing the switching element corresponding to at least one of the at least one enabled scan signal to be turned on and read the voltage of the corresponding capacitor; and determining whether the color of the light is at least one of more than three colors according to the voltage of the capacitor of the first optical sensing circuit, the voltage of the capacitor of the second optical sensing circuit, and the voltage of the capacitor of the third optical sensing circuit.

* * * * *